United States Patent [19]

Chung

[11] 4,208,718
[45] Jun. 17, 1980

[54] METHOD OF OPTIMIZING THE OPERATION OF A COMPUTER CONTROLLED MACHINE TOOL

[75] Inventor: Han-Chang Chung, West Allis, Wis.

[73] Assignee: Kearney & Trecker Corporation, West Allis, Wis.

[21] Appl. No.: 912,182

[22] Filed: Jun. 5, 1978

[51] Int. Cl.² .............. G05B 13/02; G06F 15/46; B23Q 15/00
[52] U.S. Cl. .............. 364/474; 364/105; 408/10; 318/571; 409/80; 318/561
[58] Field of Search .............. 364/474, 475, 105, 107, 364/118; 318/39, 561, 566, 571; 82/2 B, 2 R, DIG. 4; 408/8, 10, 11, 12, 13, 16; 409/80, 84, 131, 132, 187

[56] References Cited

U.S. PATENT DOCUMENTS

| | | | |
|---|---|---|---|
| 3,446,099 | 5/1969 | Lesher et al. | 408/10 |
| 3,571,834 | 3/1971 | Mathias | 408/13 X |
| 3,665,493 | 5/1972 | Glowzewski | 364/474 |
| 3,851,550 | 12/1974 | Schalles | 318/571 X |
| 4,031,368 | 6/1977 | Colding et al. | 364/475 X |
| 4,031,437 | 6/1977 | Dempsey et al. | 318/39 |
| 4,078,195 | 3/1978 | Mathias et al. | 318/571 X |

OTHER PUBLICATIONS

"Adaptive Control" Published by Bendix Industrial Controls Division, Detroit, Mich.

Primary Examiner—Joseph F. Ruggiero
Attorney, Agent, or Firm—Cyril M. Hajewski

[57] ABSTRACT

The feed rate of a computer controlled machine tool is periodically calculated every 9.6 milliseconds to produce a horsepower equal to a target horsepower at the cutting tool during a milling operation. When the feed rate rises above a predetermined level, the target horsepower is progressively lowered, and when the feed rate drops below a predetermined level, the target horsepower is progressively raised. The total amount of cutting time for each tool is measured and the amount of cutting time under increased target horsepower is also measured. When the amount of cutting time under increased target horsepower exceeds a predetermined percentage of the total cutting time for any given tool, a DULL TOOl signal is generated and the designated tool is subsequently replaced. If no cutting time is recorded, a BROKEN TOOL signal is generated and the broken tool is replaced. When the cutting tool encounters an air gap in the workpiece, the spindle speed is increased and the feed rate is increased to provide a fast feed rate through the air gap. The feed rate and spindle speed are both reduced when the cutting tool reengages the workpiece after passing through the air gap.

10 Claims, 15 Drawing Figures

METHOD OF OPTIMIZING THE OPERATION OF A COMPUTER CONTROLLED MACHINE TOOL

BACKGROUND OF THE INVENTION

This invention relates to the operation of computer controlled machine tools which are capable of performing milling operations on a workpiece. In such machine tools, a programmed spindle speed and programmed feed rate are applied to the machine tool before it begins to cut the workpiece. The programmed spindle speed and feed rate are selected to be suitable for the material of the workpiece, the type of tool and the depth of the cut. However, the depth of the cut is not always uniform but may vary from one location on the workpiece to another, and if the feed rate is held at a constant level, the horsepower developed at the cutter will vary as the cut progresses. At the peak cutter horsepower, the optimum cutting conditions will be exceeded, while at the minimum cutter horsepower, the optimum cutting conditions will not be reached. The principal object of this invention is to provide a method of optimizing the operation of the machine tool under all cutting conditions.

Another problem encountered in such computer controlled machine tools is that the tools eventually wear off their cutting edges and become too dull for use. In the past, the dull tool problem was handled by measuring the total tool cutting time for each tool and then replacing each tool after a predetermined cutting time had elapsed. However, the cutting life of a tool varies in accordance with the conditions of each cutting operation and cannot be accurately calculated in advance. If an unusually large number of deep cuts are encountered in the workpieces, or if cutting conditions are improper, the tool will become dull before the end of its pre-calculated lifetime, while ideal cutting conditions may leave the tool sharp enough for further use after the end of its pre-calculated lifetime. Another object of this invention is to provide a method of determining when the cutting tool is too dull for further use and also for determining when the tool is broken.

A further problem involves increasing the feed rate when an air gap is encountered in the workpiece to provide a fast feed rate through the air gap and then reducing the feed rate at the end of the air gap. This has been done in the past by monitoring the torque of the spindle motor, increasing the feed rate when the torque drops below a predetermined value, and then reducing the feed rate when the torque rises above a predetermined value. However, due to the normal variations in torque that result from variations in cutting conditions, it is possible for the feed rate to jump back and forth between fast feed rate and normal feed rate. A further object of this invention is to provide a method of preventing the feed rate from jumping back and forth between the fast feed rate and the normal feed rate. Other objects and advantages of the invention will be apparent from the detailed description herein.

SUMMARY OF THE INVENTION

In accordance with this invention, the feed rate of a machine tool is optimized by periodically calculating a feed rate which will produce a horsepower equal to a target horsepower at the cutter. When the feed rate rises above a predetermined level, the target horsepower is progressively lowered, and when the feed rate drops below a predetermined level, the target horsepower is progressively raised.

The total amount of cutting time for each tool is measured and the amount of cutting time under increased target horsepower is also measured. When the amount of cutting time under increased target horsepower exceeds a predetermined percentage of the total cutting time for any given tool, a DULL TOOL signal is generated and the designated tool is subsequently replaced. If no cutting time is recorded, a BROKEN TOOL signal is generated and the broken tool is replaced.

Spindle motor current is monitored, and when it drops below a predetermined air gap tolerance, the feed rate is increased to a fast feed rate and the spindle speed is increased to lower the chip load upon impact at the end of the air gap. A hysteresis quantity is employed to prevent the feed rate from switching back and forth between normal feed and fast feed rate. At the end of the air gap, the feed rate and spindle speed are switched back to their normal values.

DETAILED DESCRIPTION OF THE INVENTION

Figure 1:
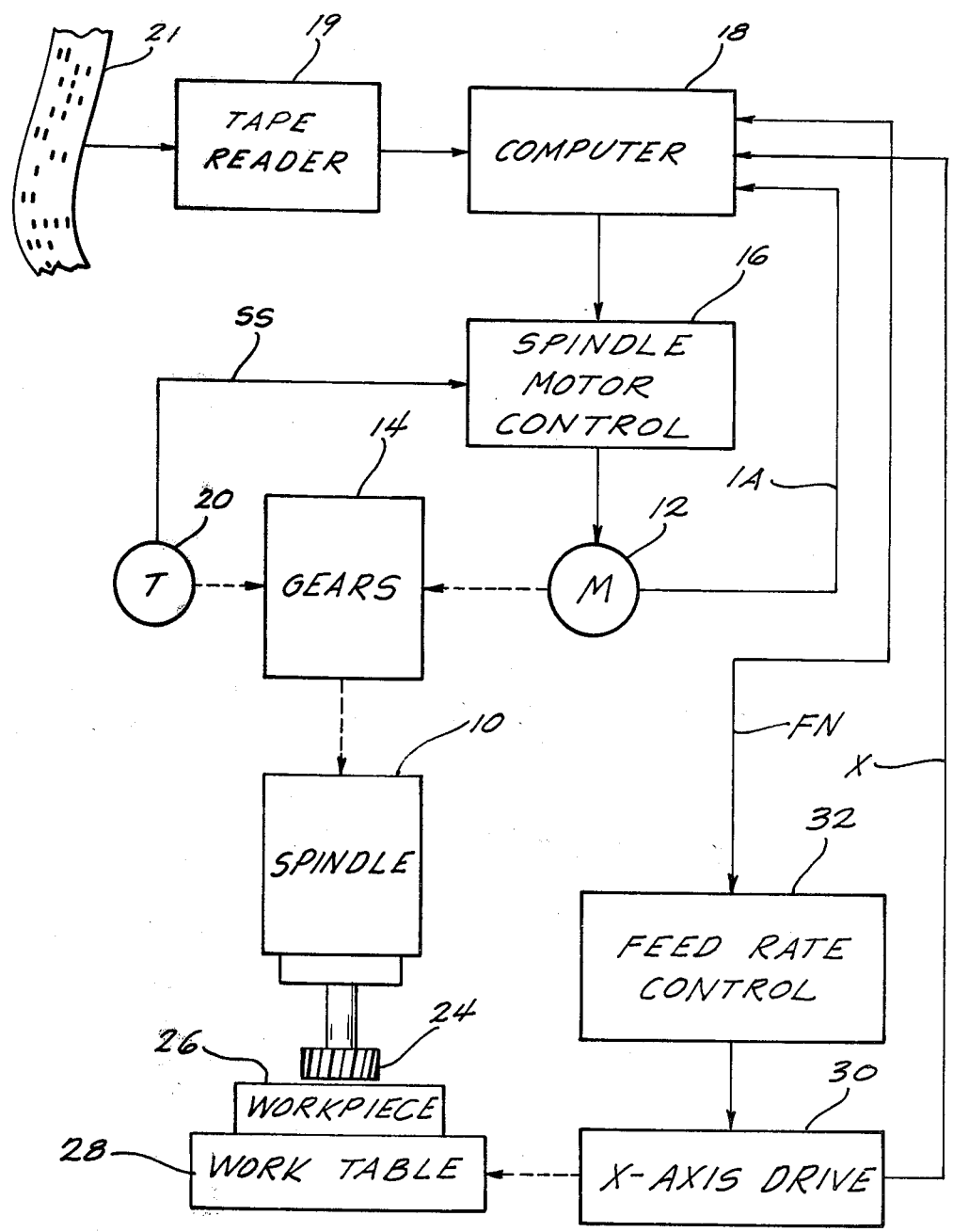
FIG. 1 is a block diagram of the spindle motor control and X-axis drive of a computer controlled machine tool.

FIG. 1 shows the portions of a computer controlled machine tool which are pertinent to the method of this invention. A spindle 10 is rotatably mounted in a conventional machine tool upright (not shown) and is rotated by a spindle motor 12 through gears 14. Spindle motor 12 is controlled by a convention motor control circuit 16 which, in turn, is controlled by a programmed computer 18. Computer 18 is a general purpose digital computer such as the PDP-8 data processor manufactured by Digital Equipment Corporation of Maynard, Massachusetts. A tape reader 19 reads commands from a part program tape 21 upon which a series of commands are written to cause the machine tool to perform a predetermined sequence of operations. The output of tape reader 19 is applied to computer 18.

A signal IA which is proportional to the armature current of spindle motor 12 is generated to Motor 12 and is coupled to computer 18. A tachometer 20 is coupled to gears 14 to generate a signal SS, which is proportional to spindle speed, and is coupled to spindle motor control 16.

Spindle 10 is adapted to receive a tool such as milling cutter 24 and is adapted to clamp cutter 24 therein. A workpiece 26 is mounted on a worktable 28 which, in turn, is movably mounted on a bed (not shown) and is driven by a conventional X-axis drive 30. X-axis drive 30 is controlled by a conventional feed rate control 32 which, in turn, is controlled by computer 18. It should be noted that in some computer controlled machine tools, the worktable is stationary and feed movement along the X-axis is obtained by moving the spindle along the X-axis. For the purposes of this invention, the relative movement can be obtained by moving either the worktable or the spindle.

Spindle 10 is mounted for movement along the conventional Y and Z axes and such movement is controlled by commands from tape reader 19 to bring milling cutter 24 into contact with workpiece 26 at a predetermined position for milling to a predetermined depth. After milling cutter 24 is in cutting position, movement of worktable 28 along the X-axis causes cutter 24 to mill a predetermined portion of workpiece 26. The principal object of this invention is to optimize the milling operation through control of the spindle speed and the feed rate during the cutting operation.

Figure 2:
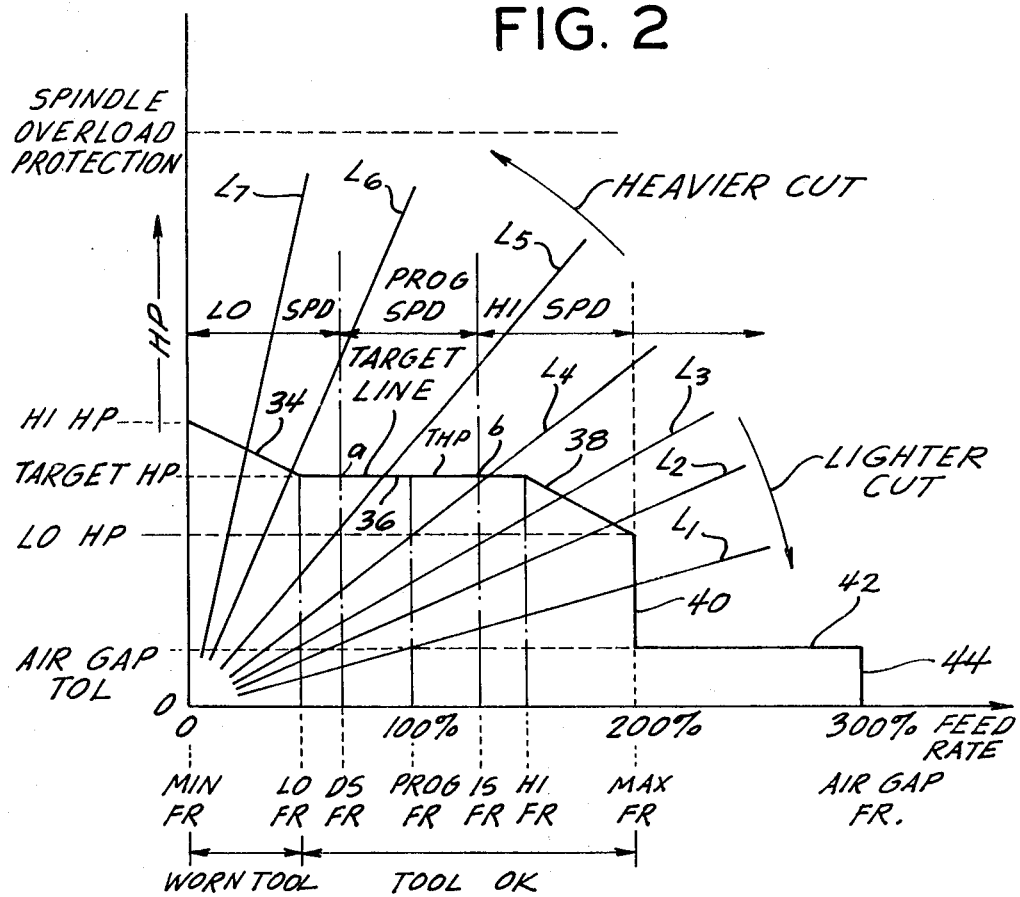
FIG. 2 is a graph of cutter horsepower Vs X-axis feed rate for the system of FIG. 1.

FIG. 2 shows the relationship between cutter horsepower and feed rate for fixed spindle speeds. The horsepower values in FIG. 2 relate to cutter horsepower, not spindle motor horsepower. Not all of the power developed in the spindle motor reaches the cutter. Some of the power is lost in the spindle gearing and in the spindle. Accordingly, the calculations in this invention are concerned with the cutter horsepower, which is a more accurate measure of cutting conditions than spindle motor horsepower.

Referring to FIG. 2, lines $L_1$ to $L_7$ which radiate from the origin of the cutter horsepower (HP) and feed rate (FR) axes are the operating lines for different depth cuts in the same material. For a given depth cut, the cutter horsepower and feed values fall along the same straight line. Line $L_1$ is the lightest cut; line $L_7$ is the heaviest cut; and lines $L_2$ to $L_6$ are progressively heavier intermediate cuts. The slope of each line $L_1$ to $L_7$ depends upon the cutter, the spindle speed, the material of the workpiece and the depth of the cut. Lines $L_1$ to $L_7$ are typical of the various possible operation conditions.

For optimum milling, the cutter should be operated on a target horsepower curve THP which is shaped as shown in FIG. 2. The target horsepower curve THP has six straight line segments 34, 36, 38, 40, 42 and 44. The first segment to be considered will be segment 36 which extends at a constant horsepower level between a low feed rate value LOFR and a high feed rate value HIFR. This segment represents the normal range of operation. The span between LOFR and HIFR in this example is equal to ±50% of the programmed feed rate PROG. FR. However, it should be understood that greater or smaller spans could be used depending on the specific conditions of each application.

Operation in the normal segment 36 of the target horsepower curve THP involves controlling the feed rate in such a manner as to produce the target horsepower at the cutter. This is done by first measuring the actual armature current IA, calculating the target armature current IT necessary to produce the target horsepower THP, and then correcting the feed rate to compensate for any difference between IA and IT.

The relationship between target cutter horsepower THP and target armature current IT depends in part on the characteristics of the spindle motor and spindle drive of the machine tool being used. For machine tools where the relationship between target cutter horsepower and target armature current is approximately linear, the following equation can be used:

$$IT = A(63{,}025\ THP/S) + BS + C$$

where IT=target armature current; THP=target cutter horsepower, S=spindle speed in RPM; and A, B and C are constants. However, in the machine tool used in this embodiment, which is the MILWAUKEE-MATIC 200, manufactured by the Kearney & Trecker Corporation of West Allis, Wisconsin, the relationship between target cutter horsepower THP and target armature current IT is given by the following non-linear equation:

$$IT = (AS^2 + BS + C)(63{,}025\ THP/S) + DS^2 + ES + F$$

where IT=target armature current; S=spindle speed in RPM; THP=target cutter horsepower; and A, B, C, D, E and F are constants. The constants A to F have different values for different spindle speed ranges. The appropriate values for four different spindle speed ranges on the MILWAUKEE-MATIC 200 are given in Chart I below:

CHART I
VALUE OF CONSTANTS FOR
TARGET ARMATURE CURRENT EQUATION

| | SPINDLE SPEED | | | |
|---|---|---|---|---|
| CST. | 1–100 RPM | 101–335 RPM | 336–1086 RPM | 1087–3600 RPM |
| A | $.253066 \times 10^{-6}$ | $-.140295 \times 10^{-7}$ | $.334004 \times 10^{-7}$ | $.288036 \times 10^{-7}$ |
| B | $-.882871 \times 10^{-5}$ | $.183851 \times 10^{-3}$ | $.108657 \times 10^{-3}$ | $.123684 \times 10^{-3}$ |
| C | $.157951 \times 10^{-1}$ | $-.835796 \times 10^{-3}$ | $.158652 \times 10^{-1}$ | $.135294 \times 10^{-1}$ |
| D | $.58648 \times 10^{-4}$ | $.174155 \times 10^{-3}$ | $.591862 \times 10^{-5}$ | $.645609 \times 10^{-6}$ |
| E | $.510961 \times 10^{-3}$ | $-.114900$ | $.633161 \times 10^{-2}$ | $.216545 \times 10^{-2}$ |
| F | $4.396063$ | $13.6457$ | $1.666786$ | $18.5624$ |

After the target armature current IT has been calculated, a new feed rate FN is calculated as explained hereinafter which will produce the desired armature current IA and thus the desired horsepower in cutter 24. It should be noted that armature current IA, which is the measured armature current as opposed to the target armature current IT, is varied by holding the armature voltage at a fixed value and varying the feed rate. Thus for any value of target armature current IT, there is a corresponding feed rate which is determined from FIG. 2 and the equations given above for IT in terms of spindle speed and horsepower. Once the desired value of IT has been calculated and the actual armature current has been measured, the new feed rate FN which is required to make IA=IT can be easily calculated.

If the new feed rate FN is between LOFR (FIG. 3) and HIFR, the operation will fall in the normal THP segment 36 in FIG. 2. If the new feed rate FN is less than LOFR, the operating conditions will fall in the THP segment 34, in which the target horsepower THP is progressively raised up to a high horsepower level HIHP. In this case, a new value for IT is calculated which corresponds to the new feed rate FN and which will place the cutter horsepower on the upwardly sloping segment 34 of the target horsepower curve THP.

If the new feed rate FN is greater than HIFR, the operating conditions will fall in downwardly sloping THP segment 38, in which target horsepower is progressively lowered to a low horsepower value LOHP. In this case, a new value for IT is calculated which will place the actual horsepower on target horsepower segment 38.

If the new feed rate FN is greater than the maximum feed rate MAXFR, the maximum feed rate is used, which places the operation on target horsepower segment 40. When the actual horsepower drops below an AIR GAP TOLERANCE LEVEL, which indicates that the cutter has entered an air gap in the workpiece, the feed rate is increased to a substantially higher air gap feed rate (AIR GAP FR) which places the operation on target horsepower segment 44. Target horsepower segment 42 is only transitional between segments 40 and 44.

The spindle speed is also varied as the feed rate is varied. For feed rates between points (a) and (b) on the target horsepower curve THP, the programmed spindle speed (PROG SPD) in FIG. 2 is employed. For feed rates below feed rate (a), a lower spindle speed (LO SPD) is employed. For feed rates above feed rate (b), a higher spindle speed (HI SPD) is employed. Feed rates (a) and (b) in FIG. 2 also designated DSFR (Decrease Speed Feed Rate) and ISFR (Increase Speed Feed Rate). Spindle speed is gradually increased to HI SPD and gradually reduced to LO SPD.

The preferred relative values of the parameters indicated in FIG. 2 and described above are listed in Chart II below for high speed cutters and carbide cutters.

CHART II
RELATIVE VALUE OF OPERATING PARAMETERS

| Parameter | Value For High Speed Steel Cutter | Value For Carbide Cutter |
| --- | --- | --- |
| HI-LO FR | *PROG FR ± 50% | PROG FR ± 60% |
| IS-DS FR | PROG FR ± 35% | PROG FR ± 40% |
| HI-LO SPD | **PROG SPD ± 10% | PROG SPD ± 15% |
| HI-LO HP | TARGET HP ± 10% | TARGET HP ± 15% |
| AIR GP FR | PROG FR + 300% | PROG FR + 350% |
| AIR GP SPD | PROG SPD + 50% | PROG SPD + 50% |
| MAX-MIN FR | PROG FR ± 100% | PROG FR ± 100% |

*PROG FR = Programmed Feed Rate
**PROG SPD = Programmed Spindle Speed

Figure 3:
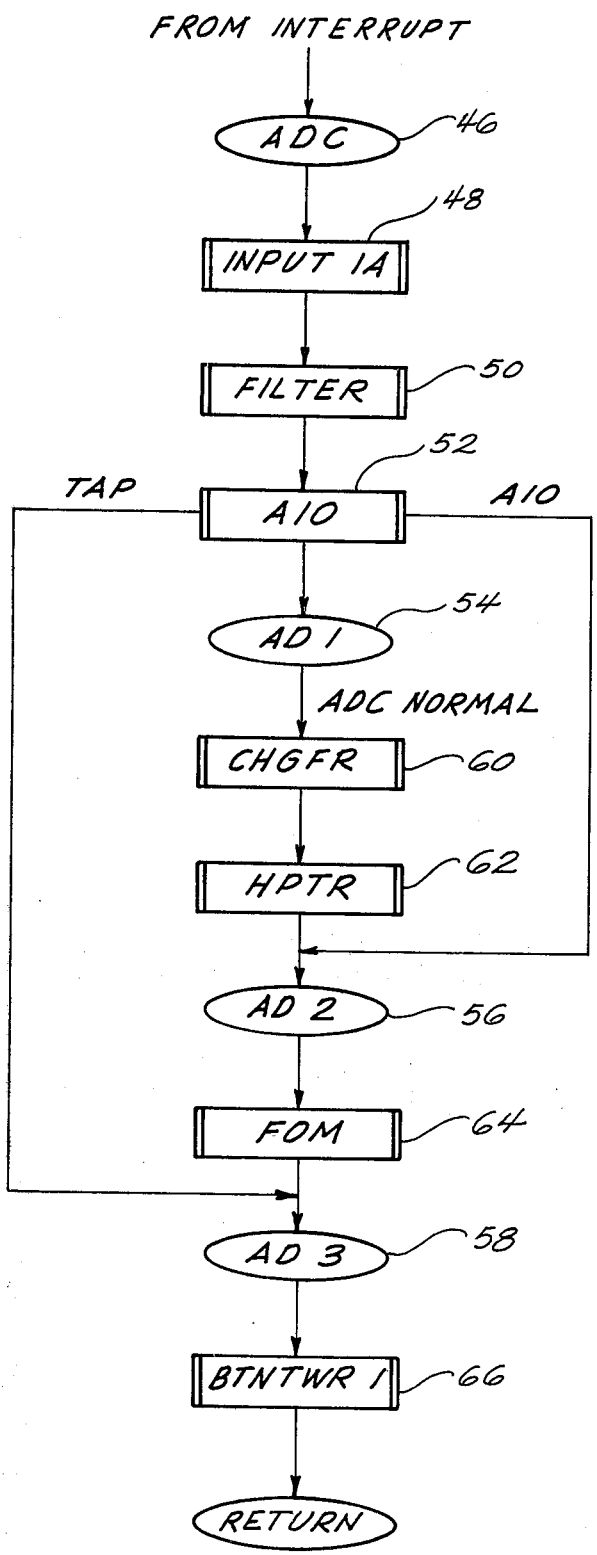
FIG. 3 is an overall flow chart of the program routines by which the method of this invention is implemented.

FIG. 3 shows the overall sequence of routines which make up the adaptive Control Program (ADC). The adaptive control program (ADC) is entered at step 46 (FIG. 3) every 9.6 milliseconds. The first step in the program is to execute the INPUT IA routine 48, which is a conventional routine for inputing the armature current signal IA (FIG. 1) to computer 18. This makes the most recent value of signal IA available in computer 18 for the calculations which follow. Signal IA is proportional to the armature current of spindle motor 12 which, in turn, is proportional to the torque at cutter 24.

The next step in the program is to execute the FILTER routine 50 which is further disclosed in FIG. 4 and is described in detail hereinafter. The purpose of FILTER routine 50 is to provide a software filter for armature current signal IA.

After FILTER routine 50, the AIO (Air Gap, Impact and Overload) routine 52 is executed. AIO routine is further disclosed in FIGS. 5A, 5B and 5C and is described in detail hereinafter. AIO routine 52 terminates at one of three different label steps AD1, AD2 or AD3 which are numbered 54, 56 and 58, respectively.

After AD1 step 54, the CHGFR (Change Feed Rate) routine 60 is executed. CHGFR routine 60 is further disclosed in FIG. 7 and is described in detail hereinafter.

Next, the HPTR (Horse Power Target) routine 62 is executed. HPTR routine 62 is further disclosed in FIGS. 6A, 6B, 6C and 6D and is described in detail hereinafter.

After AD2 step 56, the FOM (Feed Override Modification) routine 64 is executed. FOM routine 64 is further disclosed in FIG. 8 and is described in detail hereinafter.

After AD3 step 58, BTNTWR (Broken Tool and Tool Wear) routine 66 is executed. BTNTWR routine 66 is further disclosed in FIGS. 9A and 9B and is described in detail hereinafter.

Figure 4:
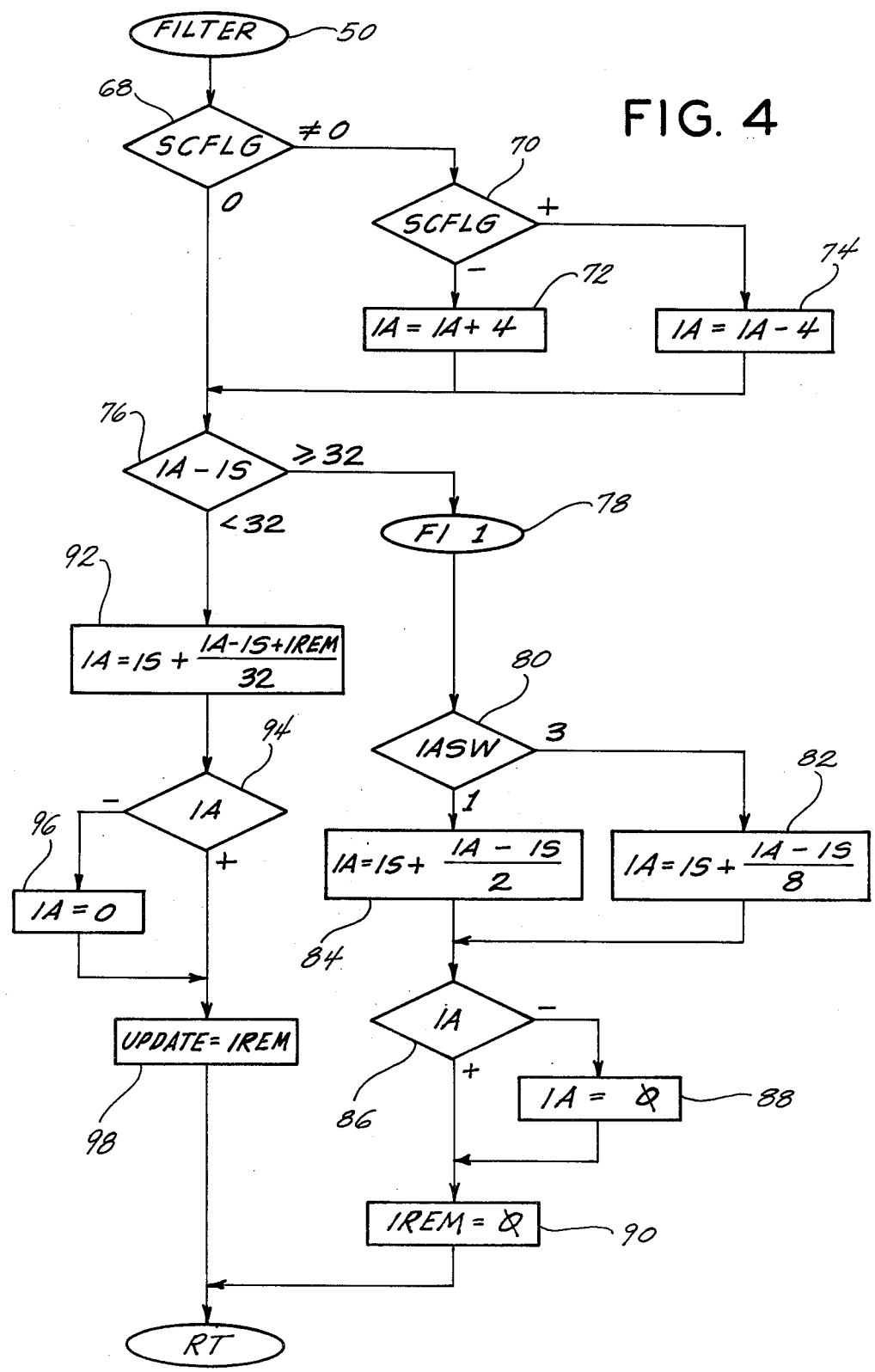
FIG. 4 is a flow chart of the filter routine of FIG. 3.

Referring to FIG. 4, the first step 68 of the FILTER routine 50 is to examine the spindle change flag (SCFLG), which is a software signal that indicates when the spindle speed is being changed. if SCFLG≠0, which indicates that the spindle speed is being changed, the next step 70 is to check the polarity of SCFLG. If SCFLG is positive, it means that spindle speed is being increased, and if SCFLG is negative, it means that spindle speed is being decreased. When spindle speed is being increased or decreased, there is a corresponding increase or decrease in IA which is not related to torque at cutter 24. To compensate for this increase or decrease in IA, a correction factor of plus or minus 4 is introduced in steps 72 and 74.

Following steps 72, 74 or 68, the quantity IA-IS is compared to 32, where IA is the most recent value of armature current, and IS is the previous value of IA. If IA has increased by more than 32 in step 76, the next step is to jump to sub-routine FI1 in step 78. The first step of sub-routine FI1 is to examine a software switch IASW in step 80. Software switch IASW is set to 1 or 3 in the AIO routine 52 to select either a high gain or medium gain filter. The high gain filter is used when the cutter 24 is traversing an air gap in workpiece 26, and the medium gain filter is used after the cutter re-engages the workpiece after traversing the air gap. The medium gain filter is defined in step 82 by the equation:

$$IA + IS + (IA - IS)/8$$

where the IA on the left side of the equation is the value of IA to be used in succeeding calculations, the IA on the right side of the equation is the most recent measured value of IA, and IS is the previous measured value of IA.

The high gain filter is defined in step 84 by the equation:

$$IA = IS + (IA - IS)/2$$

where the IA on the left side of the equation is the value of IA to be used in succeeding calculations, the IA on the right side of the equation is the most recent measured value of IA, and IS is the previous measured value of IA.

After filter steps 82 or 84, the newly calculated value of IA is examined in step 86 to see if it is positive or negative. If the newly calculated value is negative, it is set to zero in step 88 and since IA is not permitted to have a negative value. In the following step 90, IREM is set to zero. IREM is the remainder of the calculation for the low gain filter for IA in step 92. The low gain filter is used whenever IA−IS<32. The low gain filter is defined by the equation:

$$IA = IS + (IA - IS + IREM)/32$$

where the IA on the left side of the equation is the value of IA to be used in succeeding calculations, the IA on the right side of the equation is the most recent measured value of IA, IS is the previous measured value of IA, and IREM is the remainder from the previous low gain filter calculation.

After low gain filter step 92, the newly calculated value of IA is checked in step 94 to see whether it is positive or negative. If it is negative, IA is set to zero in step 96, since IA is not allowed to have a negative value. Next, in step 98, IREM is updated for use in the next low gain filter calculation.

Figure 5A:
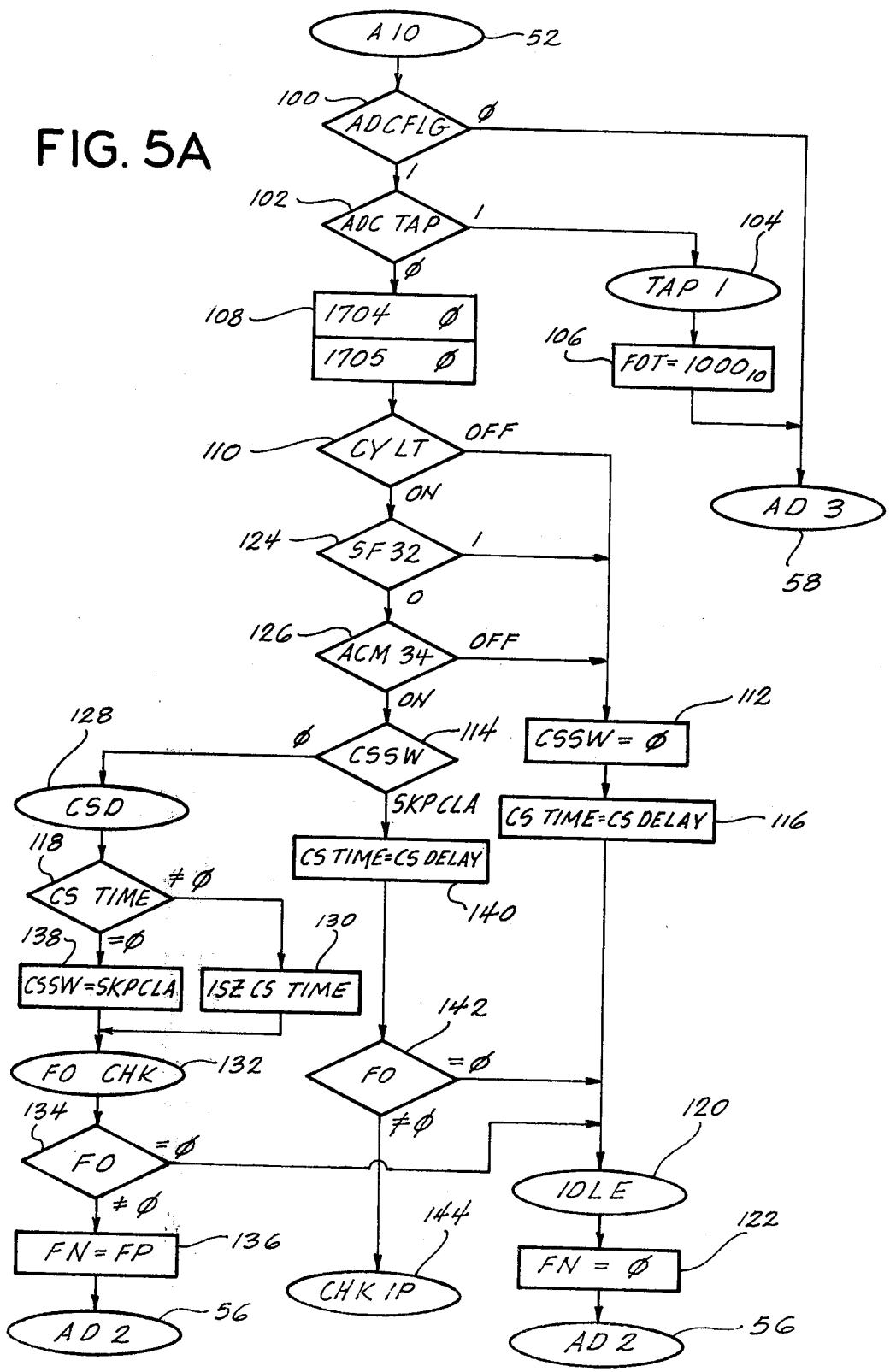
FIG. 5A, 5B and 5C together are a flow chart of the AIO routine 52 of FIG. 3.

After the above-described FILTER routine 50, the AIO (Air-gap, Impact and Overload) routine 52 is entered. AIO routine 52 is disclosed in FIGS. 5A, 5B and 5C. Referring to FIG. 5A, the first step 100 of AIO routine 52 is to examine the ADCFLG (Adaptive Control Flag) which is set to 1 when the adaptive control feature has been selected and is set to zero when the adaptive control feature is not selected. This selection is made by a command from tape reader 19 or by the setting of a front panel selector switch (not shown). If the ADC feature is not selected, control passes to step 58 (AD3) which returns to the same step in FIG. 3, thereby bypassing the adaptive control portion of the program.

If the ADC feature is selected, the next step 102 of the AIO routine 52 is to examine the ADCTAP software switch. ADCTAP is set to one by a command from tape reader 19 when a tapping operation is to be performed on workpiece 26. The adaptive control portion of the program is bypassed during a tapping operation. Therefore, when ADCTAP=1, the subroutine TAP1 is entered in step 104 and the Feed Override Total (FOT) is set to 1,000 in step 106. This selects the programmed feed rate for the tapping operation. Then control passes to step 58 (AD3) which, as noted above, bypasses the adaptive control portions of the program.

In the next step 108 of AIO routine 58, the binary numbers stored in memory locations 1704 and 1705 are zeroed. These numbers control the display lights associated with the adaptive control routine and setting them to zero turns the corresponding lights off.

In the next step 110, the cycle light CYLT is checked to see whether it is off or on. The cycle light CYLT is on whenever a machine operation such as milling or tool changing is taking place and is off when the machine is idle. When CYLT is off, control passes to step 112 in which software switch CCSW is set to zero. For the effect of CCSW, see step 114 in FIG. 5A. Next, in step 116, the CSTIME counter is set to CSDELAY, which is a negative number equal to the number of periods that the air gap routine is to be skipped after it has been first activated to prevent premature switching back to normal feed rate. For the effect of the CSTIME counter, see step 118 in FIG. 5A.

After step 116, control passes to an IDLE subroutine 120 in which the new feed rate FN is set to zero in step 122. Control then passes to step 56 (AD2) which returns to the same step in FIG. 3.

When CYLT (see step 110) is on, the next step 124 is to examine software switch 32 (SF32) which is at 1 when the spindle speed range is being changed. During spindle speed range changes, the air gap and impact routines are bypassed because the speed range change causes high armature currents which are not related to spindle torque. Therefore, when SF32=1, control then passes to step 112 which was described previously.

If SF32=0, the next step 126 is to examine software switch ACM34, which is off when the spindle is stopped and is on when the spindle is rotating either clockwise or counterclockwise. When ACM34 is off, control passes to step 112 which was described previously. When ACM34 is on, control passes to step 114 in which software switch CSSW is examined. Software switch CSSW was set to zero on step 112 of FIG. 5A. When software switch CCSW is set to zero, the next step is to enter CSD subroutine 128. The first step of CSD subroutine 128 is to examine the CSTIME counter in block 118. The CSTIME counter was set to a negative number CSDELAY in step 116 of FIG. 5A. Therefore, CSTIME will initially not equal zero. The next step 130 is to increment CSTIME and skip it if it is equal to zero. The next step is to enter FOCHK (Feed Override Check) subroutine 132. The first step 134 of this subroutine is to check the hardware switch FO (Feed Override) which is a manual selector switch. If FO=zero, control passes to IDLE subroutine 120 which has been described previously. If FO≠zero, the next step 136 is to set the new feed rate FN equal to the programmed feed rate FP. Control then passes to step 56 (AD2) which returns to the same step in FIG. 3.

After the CSTIME counter has been incremented enough times in step 130 in FIG. 5A, it will reach zero at the end of the CSDELAY time. In the next step 138, software switch CSSW (step 114) will be set to SKPCLA (skip and clear). In the next calculation cycle, the CSTIME counter will again be set to CSDELAY in step 140 as was done in step 116. Next hardware switch FO (Feed Override) will be examined in step 142. If FO=zero, control passes to IDLE subroutine 120 which was described previously. If FO≠0, CHKIP (Check Impact) subroutine 144 will be entered. The individual steps in subroutine 144 are shown in FIGS. 5B and 5C.

Figure 5B:
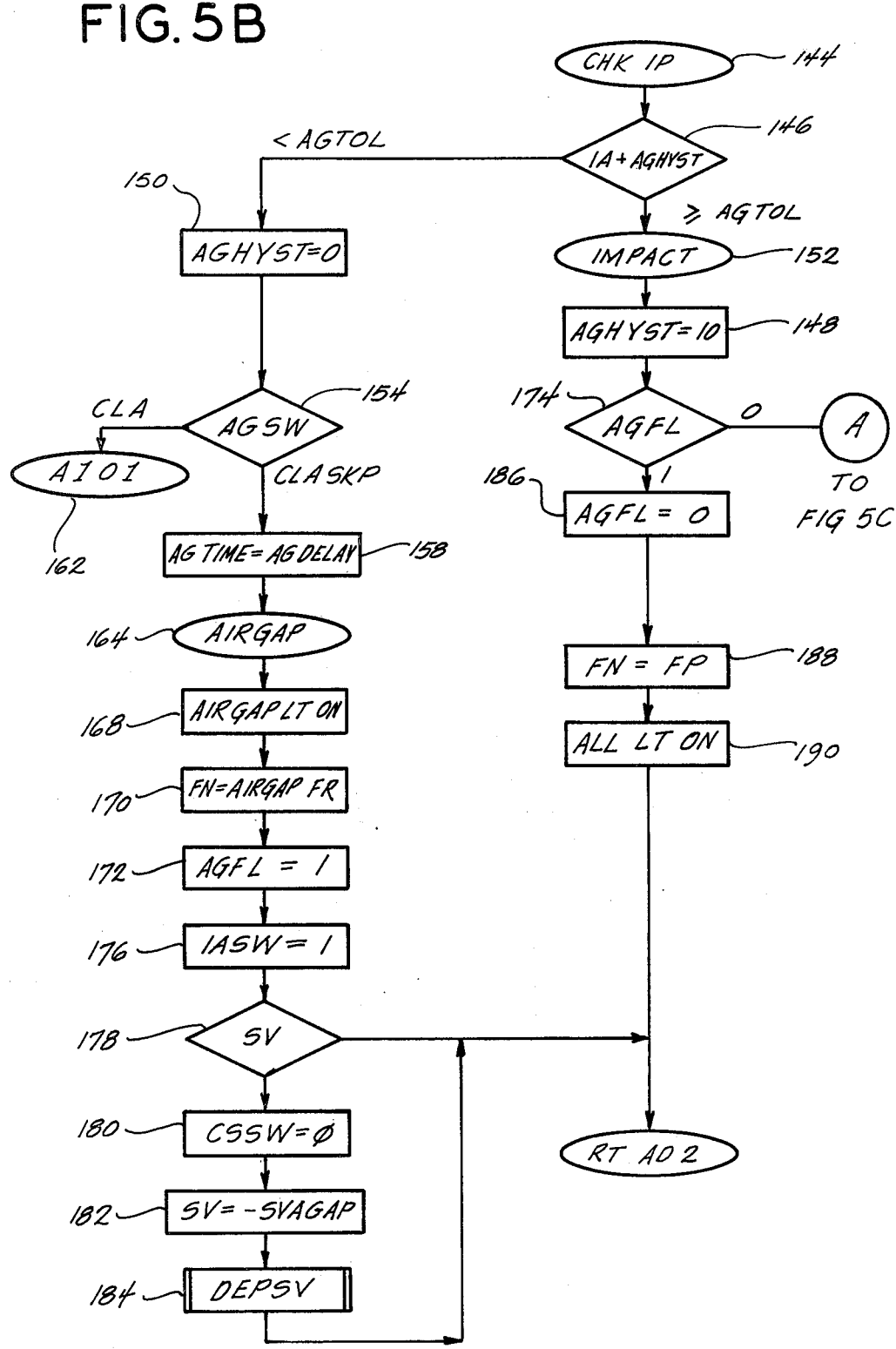
Figure 5C:
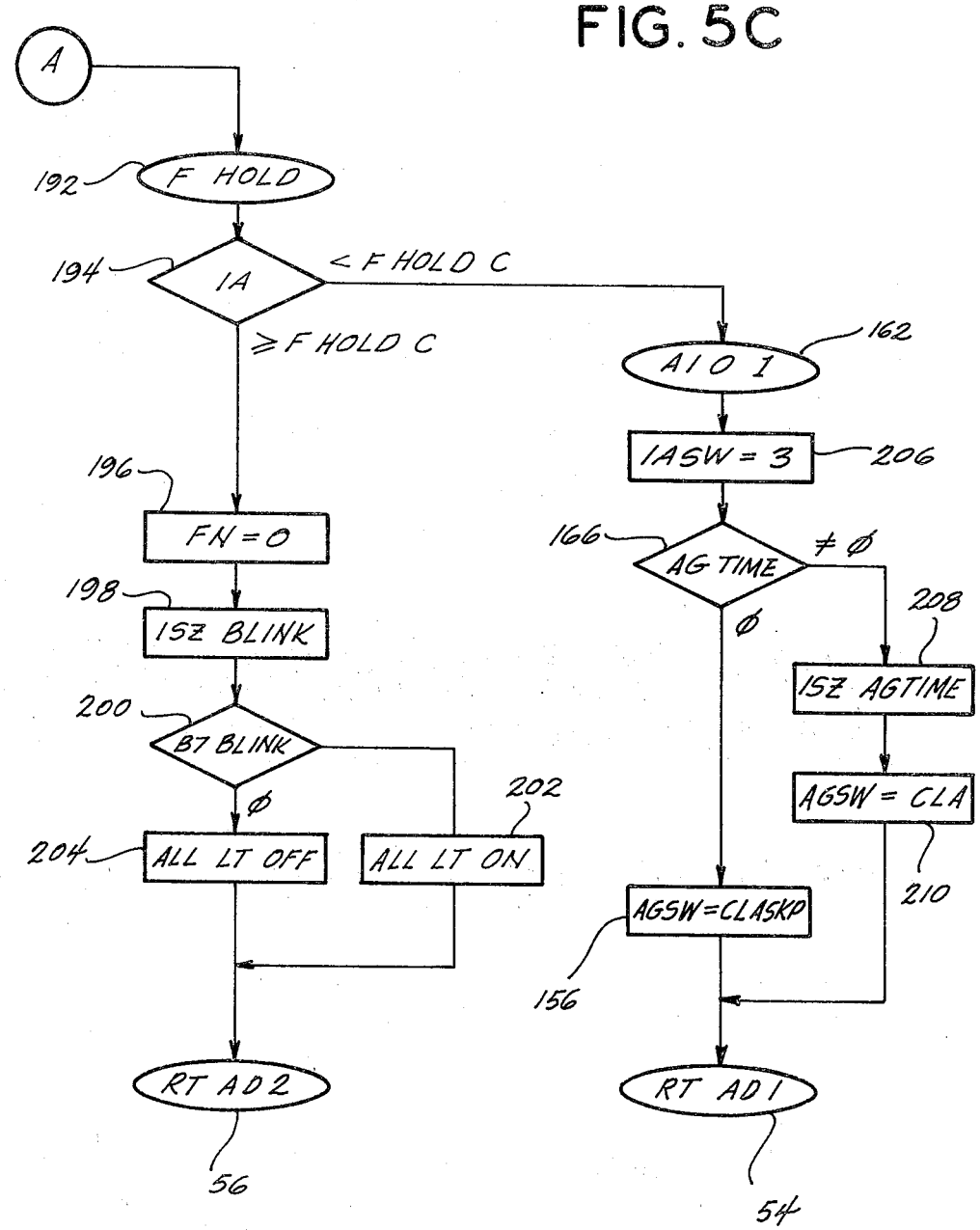

Referring to FIG. 5B, the first step 146 of subroutine 144 is to compare IA+AGHYST (Air Gap Hysteresis) with AGTOL (Air Gap Tolerance). AGHYST is initially set to 10 in step 148 when the cutting tool 24 initially impacts workpiece 26 as described hereinafter. AGTOL is set at the level below which the value of IA+AGHYST indicates that an air gap has been entered. Armature current IA drops abruptly when cutter 24 enters an air gap in workpiece 26 due to the sudden reduction in the load on spindle motor 12. This causes IA+AGHYST to drop below AGTOL at the start of an air gap.

When IA+AGHYST<AGTOL, the next step 150 is to set AGHYST to zero to prevent the value of IA+AGHYST from exceeding AGTOL due to random variations in the level of IA such as caused by electrical noise. If IA+AGHYST√AGTOL, the impact subroutine 152 is entered whose first step 148 is to set AGHYST to 10 to prevent the value of IA+AGHYST from dropping below AGTOL due to random variations in the level of IA. Thus, the hysteresis quantity AGHYST prevents false indications in step 146.

Following step 150, the next step 154 is to examine software switch AGSW, which has two positions CLA (clear) and CLASKP (Clear and Skip). AGSW is set to CLASKP in step 156 (FIG. 5C) as will be discussed hereinafter. Next, in step 158 (FIG. 5B), the AGTIME counter is set to a negative number AGDELAY. The effect of the AGTIME counter can be seen in step 166 of FIG. 5C and is described hereinafter. After step 158, the Air Gap subroutine 164 is entered.

The first step 168 of Air Gap subroutine 164 is to turn the Air Gap light on. The next step 170 is to set the new feed rate FN equal to the Air Gap Feed rate which is 300% of the programmed feed rate for high speed steel cutters and is 350% of the programmed feed rate for carbide cutters. Next, in step 172, the Air Gap Flag (AGFL) is set to 1. The effect of AGFL can be seen in step 174 of FIG. 5B.

After step 172, the next step 176 is to set IASW to 1 to select the high gain filter for IA in the next computation cycle. The effect of IASW is seen on step 80 of FIG. 4. The high gain filter is selected in step 176 (FIG. 5A) so that the circuit will respond quickly when the cutter re-engages the workpiece after passing through the air gap.

In the next step 178, the spindle voltage SV is checked to see whether it is equal to or less than SVAGAP, which is the voltage required to speed the spindle up when passing through an air gap. If SV=SVAGAP, the next step is step 56 (AD2) which returns to the same step in FIG. 3.

If SV<SVAGAP, the next step 180 is to set CSSW equal to zero. The effect of CSSW can be seen in step 114 of FIG. 5A. After step 180 (FIG. 5B), the next step 182 is to set SV=SVGAP to speed up the spindle by 50% and thus to reduce the chip load when the cutter re-engages the workpiece. Next, in step 184, the value for SV is deposited in the appropriate computer memory to put the desired speed change into effect.

When the cutter 24 re-engages the workpiece 26 after passing through the air gap, IA+AGHYST will exceed AGTOL in step 146 of FIG. 5B. Therefore, the IMPACT subroutine 152 will be entered. The first step 148 of IMPACT subroutine 152 is to set AGHYST to 10 to prevent IA+AGHYST from dropping below AGTOL due to electrical noise in signal IA. In the next step 174, the air gap flag (AGFL) is examined. AGFL was set to 1 in step 172 of AIRGAP subroutine 164 (FIG. 5B). Therefore the next step 186 is to set AGFL to zero. Next, in step 188, the new feed rate FN is set to be programmed feed rate FP. In the following step 190, all of the ADC display lights are switched on. Control then passes to step 56 (AD2) which returns to the same step in FIG. 3.

In the next computation period, step 174 will be followed by step 192 (FIG. 5C) since AGFL was set to zero in step 186. Step 192 is the label step for a feed hold (FHOLD) subroutine whose first step 194 is to compare IA to an overload tolerance quantity FHOLDC. When IA is greater than FHOLDC, it indicates an overload condition. In this case, the next step 196 is to set the new feed rate FN to zero. Next, in step 198, a software counter BLINK is incremented and skipped if zero. The next step 200 is to check bit 7 of the BLINK counter and to turn all of the ADC lights on (step 202) if bit 7 is a one or to turn all of the ADC lights off (step 204) if bit 7 is a zero. This causes all of the ADC lights to periodically blink on and off to indicate an overload condition. Control then returns to step 56 (AD2) in FIG. 3.

If IA<FHOLDC in step 194, the normal adaptive control subroutine 162 (AIO1) is entered. The first step 206 of subroutine 162 is to set IASW equal to 3 to select the medium gain filter in step 80 of FIG. 4. Next in step 166 (FIG. 5C), the AG TIME counter is checked. AG TIME was set to a negative value AGDELAY in step 158 of 5B. If AGTIME≠0, the next step 208 is to increment the AGTIME counter and skip it when it equals zero. Then in step 210, the air gap switch AGSW is set to CLA (Clear) and control then passes to step 54 (AD1) which returns to the same step in FIG. 3.

The purpose of the AGTIME counter is to bypass the AIRGAP subroutine 164 for a predetermined number of computation periods after the cutter 24 re-engages the workpiece 26 after passing through an air gap. This prevents control from returning to the AIR GAP subroutine 164 due to electrical noise in signal IA. At the end of the bypass time, AG TIME will equal 0 and the next step 156 (FIG. 5C) is to set AGSW to CLASKP (see step 154 in FIG. B) to enter AIRGAP routine 164.

After AIO routine 52 (FIGS. 5A, 5B and 5C) is completed, control passes to label step 54 (AD1) which returns to the same step in FIG. 3. The next routine is CHGFR (Change Feed Rate) routine 60 which is illustrated in detail in FIG. 7. The first step 212 of CHGFR routine 60 is to compare IT-IA to an upper limit 4000 (octal). If IT-IA≧4000 (octal), the next step 214 is an error routine 214 (ERRI) which suspends operation of the machine tool pending correction of the error. If IT-IA<4000 (octal), the next step 216 is to calculate ΔF in accordance with the formula:

$$\Delta F = \frac{(IT - IA)G + REM}{128}$$

where ΔF=change in feed rate, IT=target armature current, IA=measured armature current, REM=the remainder from the previous calculation of ΔF, and G=a constant. The value for G is selected in the HPTR (Horsepower Target) routine 62 as described hereinafter. After ΔF is calculated, the remainder REM is updated in step 218. Finally, the new feedrate FN is set to ΔF+F in step 220. Control then returns to FIG. 3, where the next routine is HPTR (Horsepower Target) routine 62, which is illustrated in detail in FIGS. 6A, 6B, 6C and 6D.

There are six lights which are associated with HPTR routine 62. Light No. 1 is on when the spindle speed is in the LO speed condition and is off when the spindle speed is normal or HI. Light No. 2 is on when the spindle speed is in the HI speed condition and is off when the spindle speed is normal or LO. Lights No. 3 and 4 are on and lights 5 to 7 are off when the feed rate is in the range MINFR to LOFR in the horsepower target curve of FIG. 2. Lights No. 4 and 5 are on and lights 3, 6 and 7 are off when the feed rate is in the range LOFR to HIFR in FIG. 2. Lights No. 5 and 6 are on and lights 3, 4 and 7 are off when the feed rate is in the range HIFR to MAXFR in FIG. 2. Light 6 alone is on when the feed rate=MAXFR in FIG. 2. Lights 3, 4 and 5 are also on alone when the feed rate is equal to MINFR, LOFR or HIFR, respectively, in FIG. 2. And light No.

7 alone is on when the feed rate is equal to the air gap feed rate in FIG. 2. Lights 1 to 7 are controlled by binary signals stored in the memory of computer 18 and when any one of the lights 1 to 7 is examined in the flow chart of FIGS. 6A and 6B, the way the examination is effected is by checking the corresponding location in the computer memory. The light is on when the corresponding binary signal is a one and is off when the corresponding binary signal is a zero.

The first step 222 of the horsepower target (HPTR) routine 62 is to check the new feed rate FN which was calculated in CHGFR routine 60. If FN<HIFR (for HIFR see FIG. 2) the next step is label step IN2 which is numbered 224. The label steps are identification points for the convenience of the programmer. The next step 226 is to check light No. 6. If light No. 6 is one (having previously been turned on in either step 228 or step 230 in FIG. 6A) the next step is label step IN3 which is numbered 232. Next in step 234, the new feed rate FN is set equal to HIFR. (For HIFR see FIG. 2.) Then light No. 5 is turned on in step 236.

If light No. 6 is off in step 226, the next step 238 is to compare FN+SHYST to ISFR. (For ISFR see FIG. 2.) FN=the new feed rate calculated in CHGFR routine 60; SHYST is a hysteresis quantity, and ISFR is the feed rate at which the spindle speed is increased. If FN+SHYST≧ISFR, the next step 240 is to turn on lights 4 and 5. The next step is label step 242 (IN5). Then SHYST is set to 8 in step 244 to prevent FN+SHYST from falling below ISFR in the next computation period due to electrical noise in signal IA. Following this, the spindle speed is gradually increased to the HISPD level in step 246. Control then returns to label step 56 (AD2) in FIG. 3.

Figure 7:
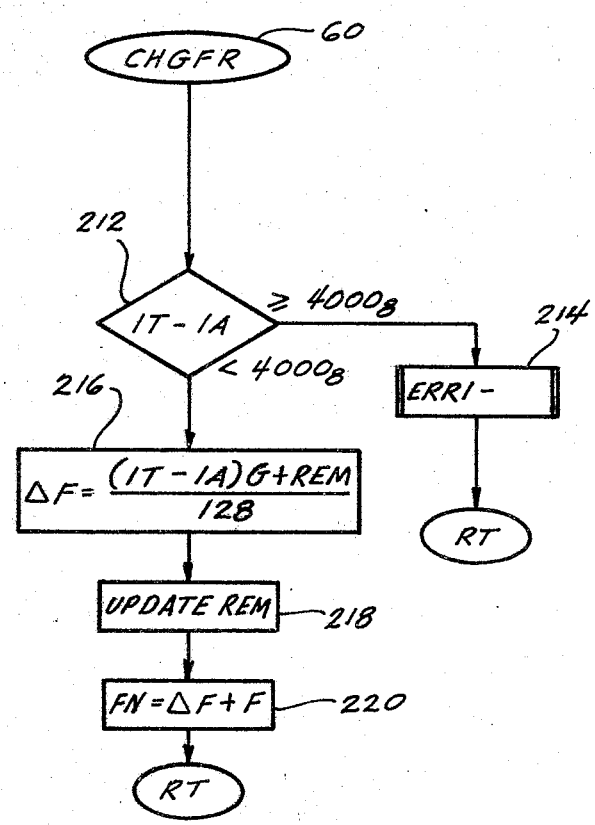
FIG. 7 is a flow chart of the CHGFR routine 60 of FIG. 3.

If, in step 222, FN≧HIFR, the next step 248 is to determine whether FN>HIFR or FN=HIFR. If FN=HIFR, the next step is label step 232 (IN3) and the succeeding steps which were described previously. If FN>HIFR, the next step 250 is to check light No. 4. If light No. 4 is on, having previously been turned on in step 240, control passes to label step 232 (IN3) and the succeeding steps. If light No. 4 is off, the next step 252 is to set the constant G to 2. (The constant G is used in the calculation for ΔF in FIG. 7.) The next step 254 identifies a calculation subroutine 256 (FIG. 6D). in which a new value for IT is calculated in accordance with the formula:

$$IT = IT - \frac{(IT - LOIT)}{(MAXFR - HIFR)} (FN - HIFR)$$

where the IT on the left side of the equation=the new value for IT (target armature current), the IT on the right side of the equation=the previously calculated value of IT, FN=the new feed rate calculated in step 220 of FIG. 7, HIFR and MAXFR are feed rate values in FIG. 2, and LOIT=the armature current required to achieve the LOHP in FIG. 2.

Figure 6A:
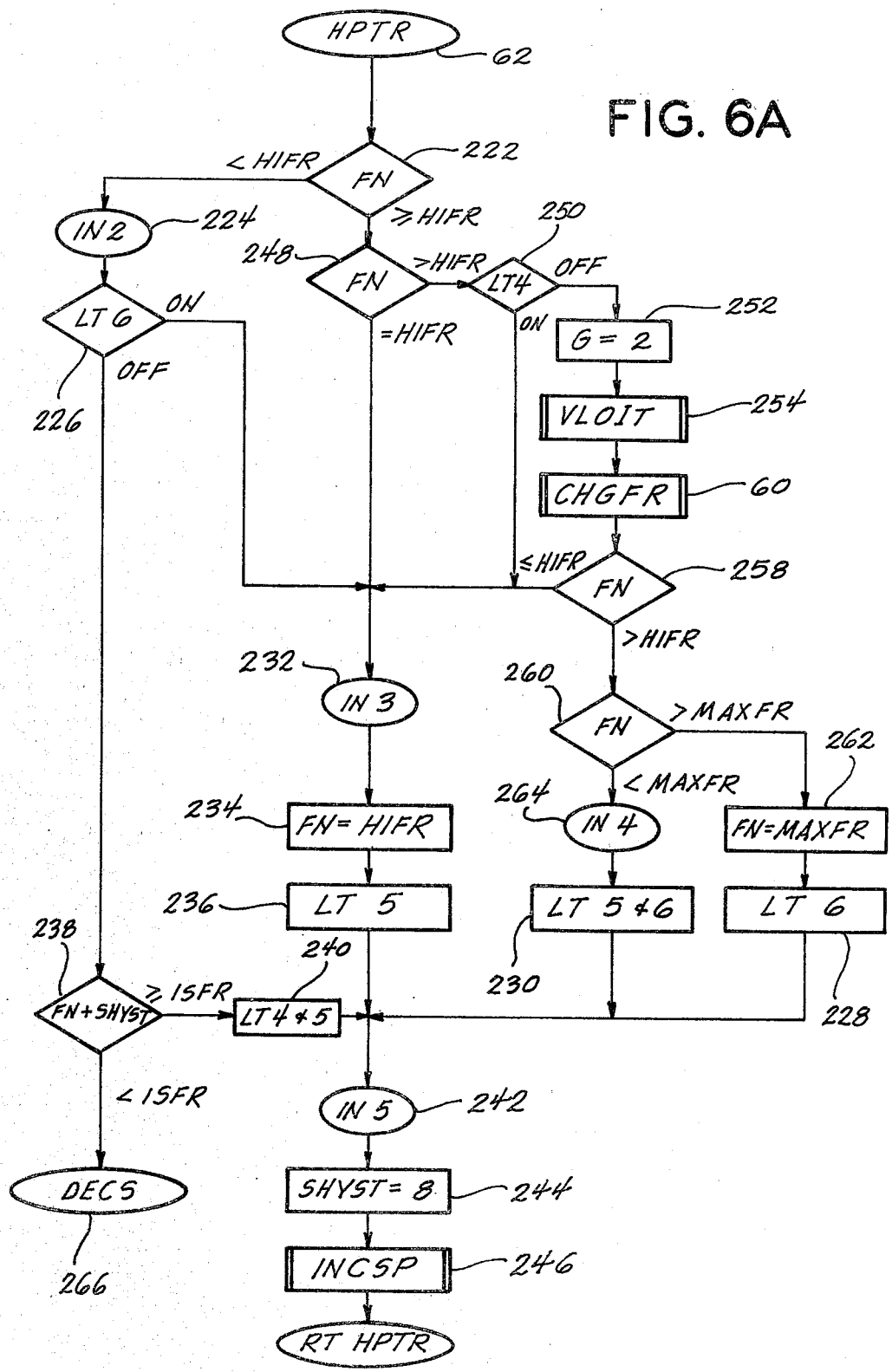
FIG. 6A, 6B, 6C and 6D together are a flow chart fot the HPTR routine 62 of FIG. 3.
Figure 6B:
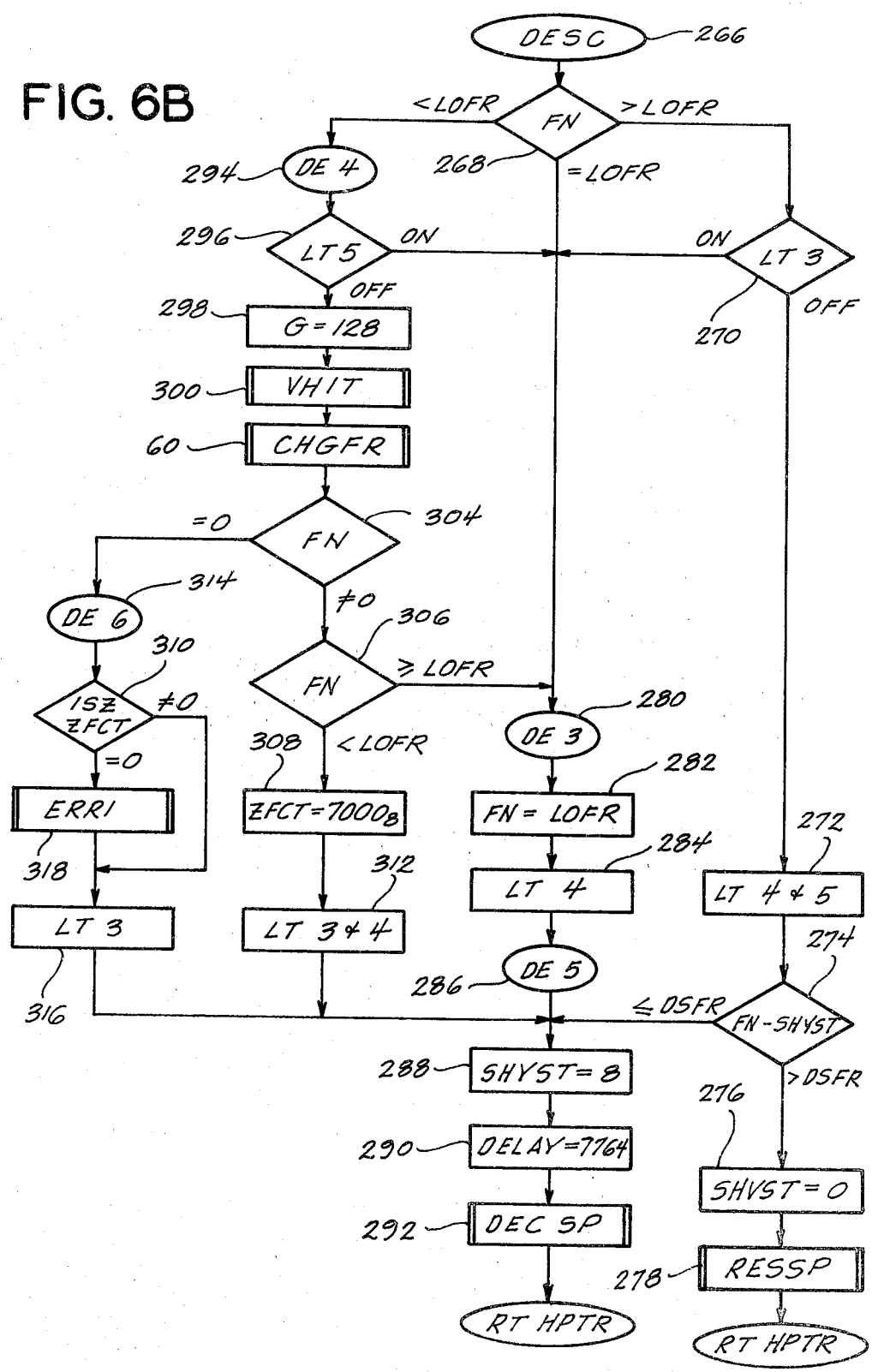
Figure 6C:
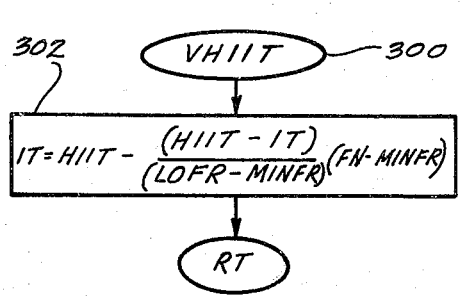
Figure 6D:
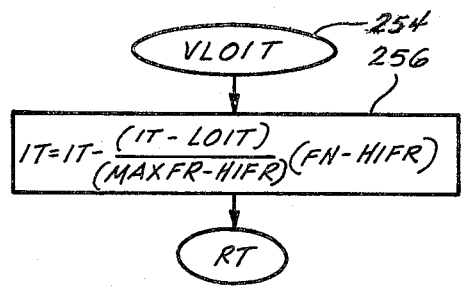

The next step 60 (CHGFR, FIG. 6A) is to calculate a new value for FN in accordance with the equations shown in FIG. 7 and described previously using the new value of IT calculated in step 256 of FIG. 6D. This new value for FN is then compared in step 258 with HIFR. If FN≦HIFR, control passes to label step 232 (IN3) and the succeeding steps which were described previously. If FN>HIFR, the next step 260 is to compare FN to MAXFR. IF FN>MAXFR, FN is set equal to MAXFR in step 262. This is done to insure that the feed rate does not exceed MAXFR except when the cutter is in an air gap. Finally, light No. 6 is turned on in step 228 and control passes to label step 242 (IN5) and the succeeding steps which were described previously.

If FN<MAXFR in step 260, the next step 264 is a label step (IN4) and in the following step 230 lights No. 5 and 6 are turned on. Control then passes to label step 242 (IN5) and the succeeding steps which were described previously.

If, in step 238 of FIG. 6A, FN+SHYST<ISFR, the next step is label step 266 (DECS). The steps which succeed step 266 are illustrated in FIG. 6B. Referring to FIG. 6B, FN is compared with LOFR in step 268. If FN>LOFR, the next step 270 is to check light No. 3. If light No. 3 is off, the next step 272 is to turn on lights 4 and 5. Then in step 274, FN−SHYST is compared to DSFR. If FN−SHYST>DSFR, the next step 276 is to set SHYST to zero to prevent FN−SHYST from falling below DSFR due to electrical noise in signal IA, which is used in the calculation for FN. Next in step 278, the spindle speed is restored to its normal level. Finally, control returns to label step 56 (AD2) in FIG. 3.

If FN=LOFR in step 268 of FIG. 6B, the next step 280 is a label step (DE3). After label step 280, FN is set equal to LOFR in step 282. Then in step 284, light No. 4 is turned on. The next step is label step 286 (DE5).

After label step 286, and also after comparison step 274 if FN−SHYST≦DSFR, the next step 288 is to set SHYST equal to 8 to prevent FN−SHYST from rising above DSFR due to electrical noise in signal IA, which is used to calculate FN. In the next step 290, the delay for the spindle decreasing operation is set at 7764 (octal). This controls the time between steps in decreasing the spindle speed which is carried out in step 292. Thereafter, control returns to label step 56 (AD2) in FIG. 3.

Referring again to step 268 on the top of FIG. 6B, if FN<LOFR, the next step 294 is label step DE4. Next, in step 296, light No. 5 is checked. If light No. 5 is on, control passes to label step 280 and the succeeding steps which have been described previously. If light No. 5 is off, the next step 298 is to set the constant G equal to 128. The constant G is used in the calculation of ΔF in FIG. 7. The next step 300 is a label step for the calculation of a new value of IT which is carried out in step 302 in FIG. 6C in accordance with the formula:

$$IT = HIIT - \frac{(HIIT - IT)}{(LOFR - MINFR)} (FN - MINFR)$$

where IT on the left side of the equation=the new value for IT (target armature current), the IT on the right side of the equation=the previously calculated value of IT, FN=the new feed rate calculated in step 220 of FIG. 7, LOFR and MINFR are feed rate values in FIG. 2, and HIIT=the armature current value required to achieve the HIHP in FIG. 2.

Following the calculation of IT, the next step 60 (FIG. 6B) is to enter the CHGFR (change feed rate) routine which is shown in FIG. 7 and has been described previously. The value for FN is re-calculated in CHGFR routine 60 with the new value for IT. The new value of FN is then checked in step 304 (FIG. 6B). If FN≠0, the next step 306 is to compare FN to LOFR. If FN≧LOFR, control passes to step 280 and the succeeding steps which have been described previously. If FN<LOFR, the next step 308 is to set the ZF counter to 7000 (octal) to step up a 5 second delay for the condition where the feed rate is zero. The effect of the ZF counter can be seen in step 310 and will be described later. The next step 312 is to turn on lights 3 and 4 to indicate that FN is between MINFR and LOFR.

Referring again to step 304, if FN=0, the next step 314 is a label step DE6. Following label step 314, the next step 310 is to increment the ZF counter, which was loaded with −7000 (octal) in step 308, and to check its resulting state. If the ZF counter is ≠0, the next step 316 is to turn light No. 3 on. Control then passes to step 288 and the subsequent steps which have been described previously. If FN remains at zero longer than 5 seconds, the ZF counter will reach zero and the next step 318 will be an error routine ERRI since something is wrong when FN remains at zero longer than 5 seconds.

Figure 8:
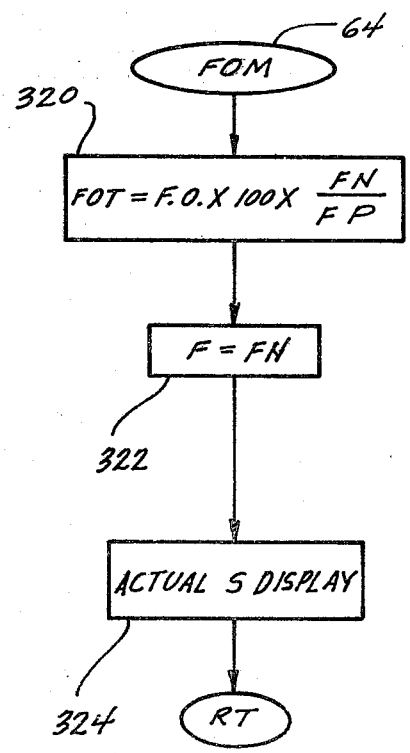
FIG. 8 is a flow chart of the FOM routine 64 of FIG. 3.

The next routine in the adaptive control program is the FOM (Feed Override Modification) routine 64 which is illustrated in FIG. 8. The first step 320 of the FOM routine 64 is to set FOT (Feed Override Total) equal to FO (Feed Override, which is selected by a manual front panel switch) times 100 (a scale factor) times FN/FP (New Feed Rate/Programmed Feed Rate). FOT is the number which is input to the X axis servo system to control the feed rate in the next 9.6 millisecond timing period. Following the calculation of FOT, the value of F is updated in step 322 for the next calculation of FN in step 220 of CHGFR routine 60. Next in step 324, the actual spindle speed is displayed on the front panel (not shown). Control then returns to label point 58 (AD3) in FIG. 3.

Figure 9A:
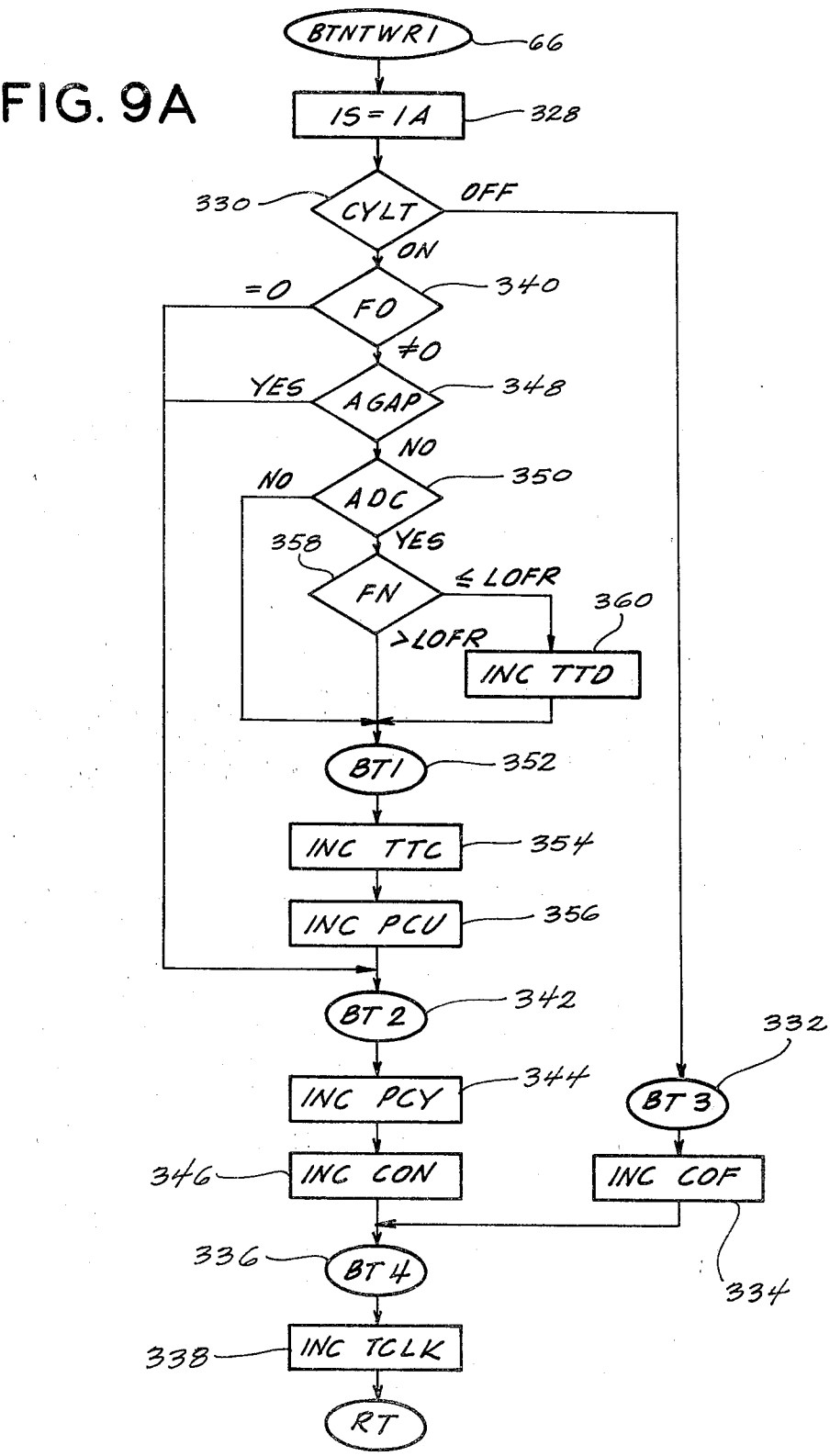
FIGS. 9A and 9B together are a flow chart of the BTNTWR routine.
Figure 9B:
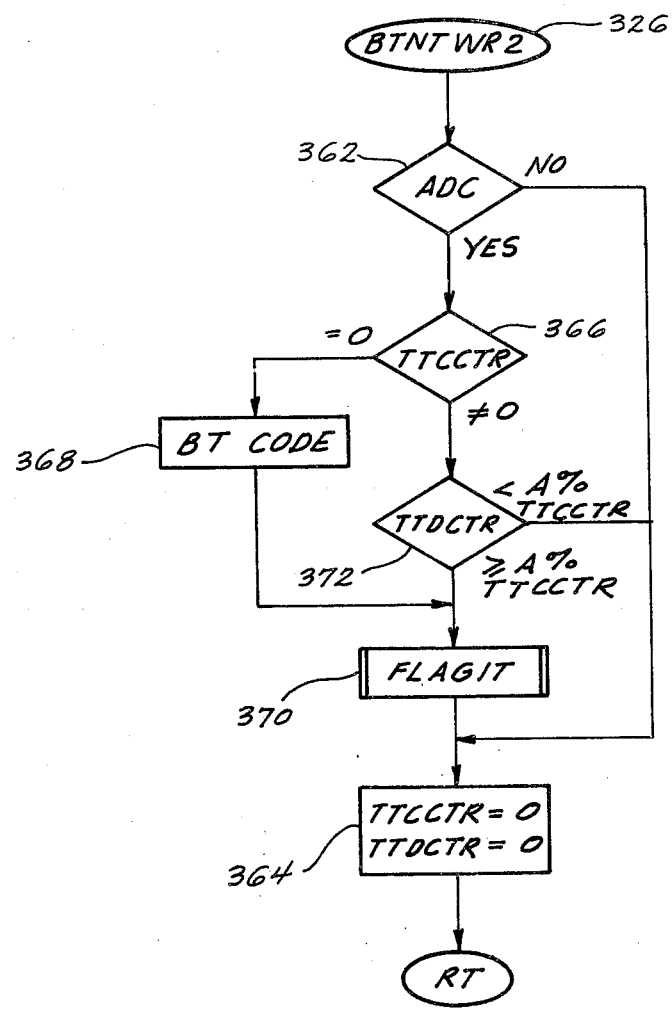

The next routine is the Broken Tool and Tool Wear Routine (BTNTWR) which consists of two parts BTNTWR1 routine 66 illustrated in FIG. 9A and BTNTWR2 routine 326 illustrated in FIG. 9B. The first step 328 of BTNTWR1 routine 66 is to update IS for the next comparison of IA−IS in step 76 of FIG. 4. Next in step 330, the cycle light is checked. The cycle light is lit whenever the machine tool is performing an operation such as machining a workpiece or changing a tool, and is off when the machine is idle. If CYLT is off, the next step 332 is a label step BT3. In the next step 334, the cycle off counter COF is incremented. This keeps track of the amount of time that the machine tool is idle. The next step 336 is a label step BT4. Finally, the time clock counter TCLK is incremented in step 338.

Referring again to step 330, if the cycle light CYLT is on, the next step 340 is to check the Feed Override switch FO. If FO=0, control passes to label step 342 (BT2). The next step 344 is to increment the Part Cycle Counter PCY. Then the Cycle On Counter CON is incremented in step 346. Control then passes to step 336 which has been described previously.

Referring again to step 340, if FO≠0 the next step 348 is to check to see whether or not the cutter is in an air gap. If the cutter is in an air gap, control passes to step 342 and the succeeding steps, which have been described previously. If the cutter is not in an air gap, the next step 350 is to check whether or not the adaptive control feature ADC has been selected. If not, the next step 352 is a label step BT1. Next in step 354, the This Tool Cutting counter TTCCTR is incremented, then the Part Cutting Counter PCU is incremented in step 356. Control then passes to step 342 and the succeeding steps which have been described previously.

Referring again to step 350, if the adaptive control feature ADC is selected, the next step 358 is to compare FN to LOFR. If FN≦LOFR, this is an indication that the tool is heavily loaded since it is operating in the high horsepower portion of the THP curve in FIG. 2. Accordingly, the next step 360 is to increment the This Tool Dull counter TTDCTR. If FN>LOFR, the TTDCTR counter is bypassed but the This Tool Cutting counter TTCCTR is later incremented in step 354. The tool wear indication employed in the method of this invention is based on the relationship between the numbers in the This Tool Cutting counter TTCCTR and the This Tool Dull counter TTDCTR as described hereinafter.

The second part of the Broken Tool and Tool Wear Routine BTNTWR2 is only entered during a tool change cycle which is commanded by an M$\phi$6 command on tape 21. After the command M$\phi$6 has been received, the first step 362 (FIG. 9B) is to check whether or not the Adaptive Control feature ADC has been selected. If it has not been selected, the next step 364 is to zero the This Tool Cutting counter TTCCTR and the This Tool Dull counter TTD. If the ADC feature has been selected, the next step 366 is to examine the This Tool Cutting counter TTCCTR. If TTCCTR=0, this is an indication that the tool which is in the spindle has never engaged the workpiece, and therefore that tool must be broken. Accordingly, the next step 368 is to activate the broken tool code BT CODE. In the next step 370, the tool which is in the spindle is flagged for replacement the next time that it is called for by the tape 21.

Referring again to step 366, if TTCCTR≠0, the next step 372 is to compare TTD (This Tool Dull counter) to a constant which is equal to A% of the current value of TTCCTR (This Tool Cutting counter). A is a constant which is selected in accordance with experience for the particular tool involved and reflects the increased wear that is encountered in the high cutter horsepower portion of the target horsepower curve THP in FIG. 2. A is selected to be the percentage of cutting time under high cutter horsepower conditions which renders the particular tool involved too dull for further use. A characteristic value of A for a typical milling cutter used in the MILWAUKEE-MATIC 200 machining center under typical cutting conditions is 50%. Higher or lower values of A can be employed depending upon the tool characteristics and cutting conditions employed.

The front panel display of the machine tool preferably includes, but is not limited to, the counter readings shown in FIG. 10. The counters listed in FIG. 2 are described in connection with FIG. 9A.

In the following program listing, written for use with a PDP-8 data processor manufactured by the Digital Equipment Corportion of Maynard, Massachusetts, the flow charts of FIGS. 3 to 9B are implemented in machine language.

The flow chart of FIG. 3 is implemented in lines 582 to 605 of the program listing.

The flow chart of FIG. 4 is implemented in lines 609 to 673 of the program listing.

The flow chart of FIGS. 5A, 5B and 5C combined is implemented in lines 676 to 832 of the program listing.

The flow chart of FIGS. 6A, 6B, 6C and 6D combined is implemented in lines 834 to 1013 of the program listing.

The flow chart of FIG. 7 is implemented in lines 1018 to 1088 of the program listing.

The flow chart of FIG. 8 is implemented in lines 1107 to 1138 of the program listing.

The flow chart of FIGS. 9A and 9B combined is implemented in lines 1143 to 1248 of the program listing.

The addresses of the counters referred to in FIGS. 9A and 9B are listed in lines 1252 to 1274 of the program listing.

Although the illustrative embodiment of the invention has been described in considerable detail for the purpose of disclosing a practical operative apparatus and method incorporating the invention, it is to be understood that the particular apparatus and method shown and described is intended to be illustrative only and that the various novel features of the invention may be incorporated in other structural forms without departing from the spirit and scope of the invention as defined in the subjoined claims.

```
                    @66  *****  ADAPTIVE CONTROL  ****

580                         /
581    66000                *66000
582    66000   7000   ADC:   NOP
583    66001   1370          TAD SCCODE
584    66002   4225          JMS INPUTIA
585                         /
586    66003   4304          JMS FILTER
587                         /
588    66004   4767          JMS I AIOX
589                         /
590    66005   1053   AD1,   TAD BIT11      /2/128=1/64
591    66006   3151          DCA GAIN
592    66007   1132          TAD IT
593    66010   4773          JMS I CHGFRX   /FN=F+(IT-IA)*GAIN/8
594    66011   0000          0              /REM
595    66012   0000          0
596                         /
597    66013   6201          CDF 0
598    66014   4766          JMS I HPTRX
599                         /
600    66015   4776   AD2,   JMS I FOMX
601                         /
602    66016   4777   AD3,   JMS I RTNTWRX
603                         /
604    66017   6203          CDI 0
605    66020   5600          JMP I ADC
606                         /
607                         /
608    66104               *66104
609    66104   7000   FILTER, NOP
610    66105   1765          TAD I SCFLGX
611    66106   7450          SNA
612    66107   5315          JMP .+6        /NO SPDL CHANGE IA OFFSET
613    66110   7700          SMA CLA
614    66111   1371          TAD NIAOFST    /NEGATIVE IA OFFSET
615    66112   1372          TAD PIAOFST    /POSITIVE IA OFFSET
616    66113   1154          TAD IA
617    66114   3154          DCA IA
618                  /   IA FILTER     IA=(IA-IS+IREM)/16+IS
619    66115   1153          TAD IS
620    66116   7041          CIA
621    66117   1154          TAD IA
622    66120   7421          MQL
623    66121   7701          ACL
624    66122   7500          SMA
625    66123   7041          CIA            /MINUS ABS (IA-IS)
626    66124   1046          TAD BIT6
627    66125   7710          SPA CLA
628    66126   5354          JMP FI1        /IA-IS >= 32
629    66127   7701          ACL            /IA-IS < 32
630    66130   1157          TAD IREM       /ADD REMAINDER
631    66131   3375          DCA T1
632                         /
633    66132   1375          TAD T1
634    66133   7510          SPA
635    66134   1374          TAD #37
636    66135   7415          ASR
637    66136   0005          5              /32
```

```
638   66137   7421           MQL
639   66140   7701           ACL
640   66141   1153           TAD IS
641   66142   7510           SPA
642   66143   7200           CLA
643   66144   3154           DCA IA
644                   /      UPDATE REMAINDER
645   66145   7521           SWP
646   66146   7413           SHL
647   66147   0005           5          /32
648   66150   7041           CIA
649   66151   1375           TAD T1
650   66152   3157           DCA IREM
651   66153   5704           JMP I FILTER
652                   /
653   66154   7521    FI1,   SWP
654   66155   7415           ASR
655   66156   0001    IASW,  1 /3        /(IA-IS)/2+IS=IA, (IA-IS)/8+IS=IA
656   66157   1153           TAD IS
657   66160   7510           SPA
658   66161   7200           CLA
659   66162   3154           DCA IA
660   66163   3157           DCA IREM
661   66164   5704           JMP I FILTER
662                   /
663   66165   6716    SCFLGX, SCFLG
664   66166   6403    HPTRX,  HPTR
665   66167   6224    AIOX,   AIO
666   66170   0200    SCCODE, 200        /SPINDLE CURRENT CODE
667   66171   7770    NIAOFST,7770
668   66172   0004    PIAOFST,4
669   66173   7001    CHGFRX, CHGFR
670   66174   0037    #37,    37
671   66175   0000    T1,     0
672   66176   7124    FOMX,   FOM
673   66177   7203    BTNTWRX,BTNTWR1
674                   /
675                   /
676                   /  AIR GAP, IMPACT, OVERLOAD CHECK
677   66200          *66200
678   66200   1705    #1705,  1705
679   66201   6030    FHOLDC, 6030       /1750-1000
680   66202   0000    BLINK,  0
681   66203   1702    #1702,  1702
682   66204   6212    AGTIMEX,AGTIME
683   66205   7600    AGDELAY,7600       /1.25 SEC
684   66206   0000    AGHYST, 0
685   66207   7112    DEPSVX, DEPSV
686   66210   7724    AGTOL,  7724 /7714/7704  /FOR R1,R2,R3
687   66211   6156    IASWX,  IASW
688   66212   0000    AGTIME, 0
689   66213   6264    AGSWX,  AGSW
690   66214   7610    CLASKP, CLA SKP
691   66215   6015    AD2X,   AD2
692   66216   6016    AD3X,   AD3
693   66217   1750    #1750,  1750       /100*10 (100% F.O.)
694   66220   0000    CSTIME, 0
695   66221   7700    CSDELAY,7700
696   66222   7164    SPDLCKX,SPDLCK
697   66223   6156    IASWY,  IASW
698                   /
699   66224   7000    AIO,    NOP
700   66225   1160           TAD ADCFLG
701   66226   7650           SNA CLA
702   66227   5616           JMP I AD3X    /650, RT TO AD3
703                   /
704   66230   7410    ADCTAP, SKP /0 FOR TAP,M49  /SKP FOR M48
705   66231   5244           JMP TAP1
706                   /
707   66232   6201           CDF 0
```

```
708  66233  3556         DCA I IOBR1
709  66234  3600         DCA I #1705
710  66235  1603         TAD I #1702
711  66236  7710         SPA CLA
712  66237  5622         JMP I SPDLCKX   /CY LT ON, SPINDLE SHIFT & M5 CHK
713  66240  3247  AI1,   DCA CSSW
714  66241  1221         TAD CSDELAY
715  66242  3220         DCA CSTIME
716  66243  5376         JMP IDLE         /CY LT OFF
717                /
718  66244  1217  TAP1,  TAD #1750
719  66245  3147         DCA FOT
720  66246  5616         JMP I AD3X       /RT TO AD3
721                /
722  66247  0000  CSSW,  0 /CLA SKP
723  66250  5363         JMP CSD
724  66251  1221         TAD CSDELAY
725  66252  3220         DCA CSTIME
726  66253  1555         TAD I FOX
727  66254  7650         SNA CLA
728  66255  5376         JMP IDLE         /F.O.=0
729                /
730  66256  1154  CHKIP, TAD IA
731  66257  1210         TAD AGTOL
732  66260  1206         TAD AGHYST
733  66261  7700         SMA CLA
734  66262  5317         JMP IMPACT
735  66263  3206         DCA AGHYST
736  66264  7610  AGSW,  CLA SKP /CLA
737  66265  5345         JMP AI01
738  66266  6261         CDF 60
739  66267  1205         TAD AGDELAY
740  66270  3604         DCA I AGTIMEX
741  66271  6201         CDF 0
742                /
743  66272  1040  AIRGAP, TAD BIT0
744  66273  3600         DCA I #1705      /AIR GAP LT ON
745  66274  1142         TAD AIRGAPF
746  66275  3145         DCA FN
747  66276  7001         IAC
748  66277  3372         DCA AGFL         /AGFL=1
749  66300  1053         TAD BIT11        /(IA-IS)/2+IS=IA
750  66301  6261         CDF 60
751  66302  3623         DCA I IASWY
752  66303  6201         CDF 0
753  66304  1152         TAD SV
754  66305  1316         TAD SVAGAP
755  66306  7650         SNA CLA
756  66307  5344         JMP RT3
757  66310  3247         DCA CSSW
758  66311  1316         TAD SVAGAP
759  66312  7041         CIA
760  66313  3152         DCA SV
761  66314  4607         JMS I DEPSVX
762  66315  5344         JMP RT3
763  66316  0000  SVAGAP, 0
764                /
765  66317  1050  IMPACT, TAD BIT8        /AGHYST=8
766  66320  3206         DCA AGHYST
767  66321  1372         TAD AGFL
768  66322  7650         SNA CLA
769  66323  5330         JMP FHOLD
770  66324  3372         DCA AGFL
771  66325  1136         TAD FP
772  66326  3145         DCA FN
773  66327  5342         JMP RT3-2
774                /
775  66330  1154  FHOLD, TAD IA
776  66331  1201         TAD FHOLDC
777  66332  7710         SPA CLA
```

```
778  66333  5345           JMP AIO1        /<1000
779  66334  3145           DCA FN          />1000
780  66335  2202           ISZ BLINK
781  66336  0000           0
782  66337  1202           TAD BLINK
783  66340  0047           AND BIT7
784  66341  7640           SZA CLA
785  66342  1060           TAD #77
786  66343  3556           DCA I IOBR1
787  66344  5615    RT3,   JMP I AD2X      /RT TO AD2
788                  /
789                  /     AIR GAP TIME DELAY BYPASS
790  66345  6261    AIO1,  CDF 60
791  66346  1121           TAD #3
792  66347  3611           DCA I IASWX
793                  /
794  66350  1212           TAD AGTIME
795  66351  7640           SZA CLA
796  66352  5356           JMP .+4
797  66353  1214           TAD CLASKP      /RESTORE AIR GAP CHK
798  66354  3613           DCA I AGSWX
799  66355  5362           JMP .+5
800  66356  2212           ISZ AGTIME
801  66357  7200           CLA
802  66360  1357           TAD .-1
803  66361  3613           DCA I AGSWX
804  66362  5624           JMP I AIO       /RT TO AD1
805                  /
806  66363  1220    CSD,   TAD CSTIME
807  66364  7640           SZA CLA
808  66365  5371           JMP .+4         /DELAY
809  66366  1214           TAD CLASKP      /RESTORE CHK
810  66367  3247           DCA CSSW
811  66370  5373           JMP FOCHK
812  66371  2220           ISZ CSTIME
813  66372  0000    AGFL,  0 /1             /0 OR 1 ONLY
814  66373  1555    FOCHK, TAD I FOX
815  66374  7640           SZA CLA
816  66375  1136           TAD FP
817  66376  3145    IDLE,  DCA FN
818  66377  5615           JMP I AD2X
819                  /
820  67164           *67164
821  67164  1723    SPDLCK, TAD I #1766
822  67165  0047           AND BIT7        /SF32
823  67166  7640           SZA CLA
824  67167  5776           JMP I AI1X      /SPDL RANGE SHIFTINT
825  67170  1317           TAD ACM34
826  67171  1377           TAD #107        /CIA OF 7610 (SKP CLA)
827  67172  7650           SNA CLA
828  67173  5776           JMP I AI1X      /M05, SPDL STOPPING
829  67174  5775           JMP I CSSWX
830  67175  6247    CSSWX, CSSW
831  67176  6240    AI1X,  AI1
832  67177  0107    #107,  107
833                  /
834                  /     HORSE POWER TARGET ROUTINE
835  66400           *66400
836  66400  0000    SHYST, 0
837  66401  7001    CHGFRY, CHGFR
838  66402  6600    DECSPX, DECSP
839                  /
840  66403  7000    HPTR,  NOP
841  66404  1145    INCS,  TAD FN
842  66405  7421           MQL
843  66406  1140           TAD HIFR
844  66407  7457           SAM
845  66410  7450           SNA
846  66411  5271           JMP IN3         /FN=HIFR
847  66412  7710           SPA CLA
```

```
848   66413   5246            JMP  IN2       /FN < HIFR
849   66414   1556            TAD  I IOBB1
850   66415   0050            AND  BIT8      /LT4
851   66416   7640            SZA  CLA
852   66417   5271            JMP  IN3
853                   /
854   66420   1052            TAD  BIT10     /4/128  WAS TAD #3
855   66421   3151            DCA  GAIN
856   66422   4775            JMS  I VLITX
857   66423   4601            JMS  I CHGFRY
858   66424   0000            0              /REM
859   66425   0000            0
860                   /
861   66426   1145            TAD  FN
862   66427   7421            MQL
863   66430   1140            TAD  HIFR
864   66431   7457            SAM
865   66432   7750            SPA SNA CLA
866   66433   5271            JMP  IN3       /FN<=HIFR
867   66434   1141            TAD  MAXFR     /FN>HIFR
868   66435   7457            SAM
869   66436   7710            SPA CLA
870   66437   5243            JMP  IN4       /FN<MAXFR
871   66440   1141            TAD  MAXFR     /FN>=MAXFR
872   66441   3145            DCA  FN
873   66442   5244            JMP  IN4+1
874   66443   1047   IN4,     TAD  BIT7      /LT5
875   66444   1046            TAD  BIT6      /LT6
876   66445   5263            JMP  IN5
877                   /
878   66446   1556   IN2,     TAD  I IOBB1
879   66447   0046            AND  BIT6      /LT6
880   66450   7640            SZA CLA
881   66451   5271            JMP  IN3
882   66452   1145            TAD  FN
883   66453   1200            TAD  SHYST
884   66454   7421            MQL
885   66455   1137            TAD  ISFR
886   66456   7457            SAM
887   66457   7710            SPA CLA
888   66460   5275            JMP  DECS
889                   /
890   66461   1050            TAD  BIT8      /LT 4
891   66462   1047            TAD  BIT7      /LT 5
892   66463   1556   IN5,     TAD  I IOBB1
893   66464   3556            DCA  I IOBB1
894   66465   1050            TAD  BIT8      /SHYST=8
895   66466   3200            DCA  SHYST
896   66467   4674            JMS  I INCSPX
897   66470   5603            JMP  I HPTR
898                   /
899   66471   1140   IN3,     TAD  HIFR
900   66472   3145            DCA  FN
901   66473   5262            JMP  IN5-1
902   66474   6663   INCSPX,  INCSP
903                   /
904   66475   1145   DECS,    TAD  FN
905   66476   7421            MQL
906   66477   1134            TAD  LOFR
907   66500   7457            SAM
908   66501   7450            SNA
909   66502   5326            JMP  DE3       /FN=LOFR
910   66503   7710            SPA CLA
911   66504   5340            JMP  DE4       /FN<LOFR
912   66505   1556            TAD  I IOBB1   /FN>LOFR
913   66506   0051            AND  BIT9      /LT3
914   66507   7640            SZA CLA
915   66510   5326            JMP  DE3
916   66511   1047            TAD  BIT7      /LT5
917   66512   1050            TAD  BIT8      /LT4
```

```
918   66513   1556            TAD I IOBB1
919   66514   3556            DCA I IOBB1
920                   /
921   66515   1200            TAD SHYST
922   66516   1135            TAD DSFR
923   66517   7457            SAM
924   66520   7750            SPA SNA CLA
925   66521   5333            JMP DE5+2           /FN<=DSFR+SHYST
926   66522   3200            DCA SHYST
927   66523   4725            JMS I RESSPY
928   66524   5603            JMP I HPTR
929   66525   6625   RESSPY,  RESSP
930                   /
931   66526   1134   DE3,     TAD LOFR
932   66527   3145            DCA FN
933   66530   1050            TAD BIT8            /LT4
934   66531   1556   DE5,     TAD I IOBB1
935   66532   3556            DCA I IOBB1
936   66533   1050            TAD BIT8            /SHYST=8
937   66534   3200            DCA SHYST
938   66535   1067            TAD #7764
939   66536   4602            JMS I DECSPX
940   66537   5603            JMP I HPTR
941                   /
942   66540   1556   DE4,     TAD I IOBB1
943   66541   0047            AND BIT7            /LT5
944   66542   7640            SZA CLA
945   66543   5326            JMP DE3
946   66544   7200            CLA                 /1/128
947   66545   3151            DCA GAIN
948   66546   4776            JMS I VHITX
949   66547   4601            JMS I CHGFRY
950   66550   0000            0       /REM
951   66551   0000            0
952                   /
953   66552   1145            TAD FN
954   66553   7450            SNA
955   66554   5367            JMP DE6             /FN=0, FEED HOLD, LT3 ON
956   66555   7421            MQL
957   66556   1134            TAD LOFR
958   66557   7457            SAM
959   66560   7700            SMA CLA
960   66561   5326            JMP DE3
961   66562   1063            TAD #7000           /COUNT 5 SECS THEN STOP
962   66563   3377            DCA ZFCTR
963   66564   1050            TAD BIT8            /LT4
964   66565   1051   DE2,     TAD BIT9            /LT3
965   66566   5331            JMP DE5
966   66567   2377   DE6,     ISZ ZFCTR
967   66570   7410            SKP
968   66571   4774            JMS I ERRIY         /ZERO FEEDRATE FOR 5 SECS
969   66572   6201            CDF 0
970   66573   5365            JMP DE2
971   66574   5514   ERRIY,   ERRI
972   66575   6724   VLITX,   VLIT
973   66576   6753   VHITX,   VHIT
974   66577   0000   ZFCTR,   0
975                   /
976   66724           *66724
977   66724   7000   VLIT,    NOP
978   66725   6261            CDF 60
979   66726   1140            TAD HIFR
980   66727   7041            CIA
981   66730   1141            TAD MAXFR
982   66731   3352            DCA T3+1
983   66732   1133            TAD LOIT
984   66733   7041            CIA
985   66734   1132            TAD IT
986   66735   3351            DCA T3
987   66736   1140            TAD HIFR
```

```
988   66737   7041           CIA
989   66740   1145           TAD FN
990   66741   7425           MUY MQL
991   66742   6751           T3
992   66743   7407           DVI
993   66744   6752           T3+1
994   66745   7701           ACL
995   66746   7041           CIA
996   66747   1132           TAD IT
997   66750   5724           JMP I VLIT
998   66751   0000   T3,     0
999   66752   0000           0
1000                 /
1001  66753   7000   VHIT,   NOP
1002  66754   6261           CDF 60
1003  66755   1132           TAD IT
1004  66756   7041           CIA
1005  66757   1131           TAD HIIT
1006  66760   7425           MQL MUY
1007  66761   0145           FN
1008  66762   7407           DVI
1009  66763   0134           LOFR
1010  66764   7701           ACL
1011  66765   7041           CIA
1012  66766   1131           TAD HIIT
1013  66767   5753           JMP I VHIT
1014                 /
1015                 /
1016  67000           *67000
1017  67000   0000   ACTS:   0
1018  67001   7000   CHGFR,  NOP
1019  67002   6261           CDF 60
1020  67003   3306           DCA DIT
1021  67004   1201           TAD CHGFR
1022  67005   3244           DCA REMA1
1023  67006   1201           TAD CHGFR
1024  67007   3271           DCA REMA2
1025                 /
1026  67010   1154           TAD IA
1027  67011   7421           MQL
1028  67012   7575           DCM
1029  67013   7443           DAD
1030  67014   7106           DLT
1031  67015   7445           DST
1032  67016   7104           T2              /(IT-IA) 2 WORDS
1033  67017   7000           NOP
1034  67020   7510           SPA
1035  67021   7575           DCM
1036  67022   7443           DAD
1037  67023   7110           M*4001
1038  67024   7710           SPA CLA
1039  67025   5235           JMP .+10
1040  67026   6201           CDF 0
1041  67027   1041           TAD BIT1
1042  67030   7421           MQL
1043  67031   1525           TAD I IBB61X
1044  67032   7501           MQA
1045  67033   3525           DCA I IBB61X
1046  67034   5300           JMP CHGFRT
1047                 /
1048  67035   1151           TAD GAIN
1049  67036   3242           DCA .+4
1050  67037   7663           DLD
1051  67040   7104           T2
1052  67041   7413           SHL
1053  67042   0000           0               /0,1,3
1054  67043   7443           DAD
1055  67044   0000   REMA1,  0
1056  67045   7445           DST
1057  67046   7104           T2
```

| | | | | | |
|---|---|---|---|---|---|
| 1058 | 67047 | 7500 | | SMA | |
| 1059 | 67050 | 7573 | | DPIC | |
| 1060 | 67051 | 7443 | | DAD | |
| 1061 | 67052 | 6717 | | ##77 | |
| 1062 | 67053 | 7415 | | ASR | |
| 1063 | 67054 | 0007 | | 7 | |
| 1064 | 67055 | 7445 | | DST | |
| 1065 | 67056 | 6751 | | T3 | |
| 1066 | 67057 | 7701 | | ACL | |
| 1067 | 67060 | 3146 | | DCA DELF | |
| 1068 | | | / | | |
| 1069 | 67061 | 7663 | | DLD | |
| 1070 | 67062 | 6751 | | T3 | |
| 1071 | 67063 | 7413 | | SHL | |
| 1072 | 67064 | 0007 | | 7 | |
| 1073 | 67065 | 7575 | | DCM | |
| 1074 | 67066 | 7443 | | DAD | |
| 1075 | 67067 | 7104 | | T2 | |
| 1076 | 67070 | 7445 | | DST | |
| 1077 | 67071 | 0000 | REMA2, | 0 | |
| 1078 | 67072 | 7621 | | CAM | |
| 1079 | | | | | |
| 1080 | 67073 | 1146 | | TAD DELF | |
| 1081 | 67074 | 1143 | | TAD F | |
| 1082 | 67075 | 7510 | | SPA | |
| 1083 | 67076 | 7200 | | CLA | |
| 1084 | 67077 | 3145 | | DCA FN | |
| 1085 | 67100 | 6201 | CHGFRT, | CDF 0 | |
| 1086 | 67101 | 2201 | | ISZ CHGFR | |
| 1087 | 67102 | 2201 | | ISZ CHGFR | |
| 1088 | 67103 | 5601 | | JMP I CHGFR | |
| 1089 | 67104 | 0000 | T2, | 0 | |
| 1090 | 67105 | 0000 | | 0 | |
| 1091 | 67106 | 0000 | DIT, | 0 | |
| 1092 | 67107 | 0000 | | 0 | /THIS ADDR MUST BE ZERO |
| 1093 | 67110 | 4001 | M#4001, | 4001 | |
| 1094 | 67111 | 7777 | | 7777 | |
| 1095 | | | / | | |
| 1096 | 67112 | 7000 | DEPSV, | NOP | |
| 1097 | 67113 | 1152 | | TAD SV | |
| 1098 | 67114 | 3152 | | DCA SV | |
| 1099 | 67115 | 1152 | | TAD SV | |
| 1100 | 67116 | 1040 | | TAD BIT0 | |
| 1101 | 67117 | 7000 | ACM34: | NOP /CIA /SKP CLA /FOR M3,M4,M5 | |
| 1102 | 67120 | 3722 | | DCA I IOBBSV | |
| 1103 | 67121 | 5712 | | JMP I DEPSV | |
| 1104 | 67122 | 1725 | IOBBSV, | 1725 | |
| 1105 | 67123 | 1766 | #1766, | 1766 | |
| 1106 | | | / | | |
| 1107 | | | / FEEDRATE OVERRIDE MODIFICATION | | |
| 1108 | 67124 | 7000 | FOM, | NOP | |
| 1109 | 67125 | 6201 | | CDF 0 | |
| 1110 | 67126 | 1555 | | TAD I FOX | |
| 1111 | 67127 | 6261 | | CDF 60 | |
| 1112 | 67130 | 7425 | | MQL MUY | |
| 1113 | 67131 | 7161 | | #144 | |
| 1114 | 67132 | 7200 | | CLA | |
| 1115 | 67133 | 7405 | | MUY | |
| 1116 | 67134 | 0145 | | FN | |
| 1117 | 67135 | 7407 | | DVI | |
| 1118 | 67136 | 0136 | | FP | |
| 1119 | 67137 | 7701 | | ACL | |
| 1120 | 67140 | 3147 | | DCA FOT | /FOT = FO*100*FV/FP |
| 1121 | | | / | | |
| 1122 | 67141 | 1145 | | TAD FN | |
| 1123 | 67142 | 3143 | | DCA F | |
| 1124 | | | / DISPLAY S ACTUAL | | |
| 1125 | 67143 | 7421 | | MQL | |
| 1126 | 67144 | 6201 | | CDF 0 | |
| 1127 | 67145 | 1722 | | TAD I IOBBSV | |

```
1128  67146  6261            CDF 60
1129  67147  1040            TAD BIT0
1130  67150  7510            SPA
1131  67151  7041            CIA
1132  67152  7415            ASR
1133  67153  0003            3
1134  67154  7407            DVI
1135  67155  0000    MX,     0         /MX1/MX2/MX3
1136  67156  7701            ACL
1137  67157  3200            DCA ACTS
1138  67160  5724            JMP I FOM
1139  67161  0144    #144,   144
1140                  /
1141                  /
1142  67200          *67200
1143                  / CUTTING TIME, DULL TOOL, SHARP TOOL TIME
1144  67200  1702            ##1702, 1702
1145  67201  6210    AGTOLY, AGTOL
1146  67202  6206    AGHYSTX,AGHYST
1147  67203  7000    BTNTWR1,NOP
1148  67204  1154            TAD IA
1149  67205  3153            DCA IS          /SAVE IA IN IS
1150  67206  6201            CDF 0
1151  67207  1600            TAD I ##1702
1152  67210  7700            SMA CLA
1153  67211  5265            JMP BT3         /CYCLE OFF
1154                  /
1155  67212  1555            TAD I FOX
1156  67213  6261            CDF 60
1157  67214  7650            SNA CLA
1158  67215  5252            JMP BT2
1159                  /
1160  67216  1154            TAD IA
1161  67217  1601            TAD I AGTOLY
1162  67220  1602            TAD I AGHYSTX
1163  67221  7710            SPA CLA
1164  67222  5252            JMP BT2
1165                  /
1166  67223  1160            TAD ADCFLG
1167  67224  7650            SNA CLA
1168  67225  5240            JMP BT1         /NO ADC
1169                  /
1170  67226  1145            TAD FN
1171  67227  7041            CIA
1172  67230  1134            TAD LOFR
1173  67231  7710            SPA CLA
1174  67232  5240            JMP BT1         /FN>LOFR
1175  67233  7663            DLD
1176  67234  7375            TTDCTR
1177  67235  7573            DPIC
1178  67236  7445            DST
1179  67237  7375            TTDCTR
1180  67240  7663    BT1,    DLD
1181  67241  7372            TTCCTR          /THIS TOOL CUTTING CTR
1182  67242  7573            DPIC
1183  67243  7445            DST
1184  67244  7372            TTCCTR
1185  67245  7663            DLD
1186  67246  7367            PCUCTR          /PART CUTTING CTR
1187  67247  7573            DPIC
1188  67250  7445            DST
1189  67251  7367            PCUCTR
1190                  /
1191                  / CYCLE TIME
1192  67252  7663    BT2,    DLD
1193  67253  7364            PCYCTR
1194  67254  7573            DPIC
1195  67255  7445            DST
1196  67256  7364            PCYCTR
1197  67257  7663            DLD
```

```
1198  67260  7361           CONCTR
1199  67261  7573           DPIC
1200  67262  7445           DST
1201  67263  7361           CONCTR
1202  67264  5273           JMP BT4
1203  67265  6261   BT3,    CDF 60
1204  67266  7663           DLD
1205  67267  7356           COFCTR
1206  67270  7573           DPIC
1207  67271  7445           DST
1208  67272  7356           COFCTR
1209  67273  7663   BT4,    DLD
1210  67274  7353           TCLKCTR
1211  67275  7573           DPIC
1212  67276  7445           DST
1213  67277  7353           TCLKCTR
1214  67300  7621           CAM
1215  67301  5603           JMP I BTNTWR1
1216                /
1217  67302  1160   BTNTWR2,TAD ADCFLG
1218  67303  7650           SNA CLA
1219  67304  5330           JMP TWRT       /NO ADC
1220  67305  7663           DLD
1221  67306  7372           TTCCTR         /THIS TOOL CUTTING TIME
1222  67307  7451           DPSZ
1223  67310  5313           JMP .+3
1224  67311  4741           JMS I ERRIZ
1225  67312  5326           JMP BT5
1226  67313  7575           DCM
1227  67314  7443           DAD
1228  67315  7375           TTDCTR         /THIS TOOL DULL TIME
1229  67316  7443           DAD
1230  67317  7375           TTDCTR
1231  67320  7000           NOP
1232  67321  7000           NOP
1233  67322  7000           NOP
1234  67323  7000           NOP
1235  67324  7710           SPA CLA
1236  67325  5330           JMP TWRT       /CUTTER OK YET
1237  67326  6272   BT5,    CIF 70
1238  67327  4740           JMS I FLAGITX  /CUTTER DULL, PUT IT ASIDE
1239  67330  6261   TWRT,   CDF 60
1240  67331  7665           DDZ
1241  67332  7375           TTDCTR         /ZERO OUT THIS TOOL DULL CTR
1242  67333  7665           DDZ
1243  67334  7372           TTCCTR         /ZERO OUT THIS TOOL CUTTING CTR
1244  67335  6273           CDI 70
1245  67336  5737           JMP I TOOL7X
1246  67337  4000   TOOL7X, 74000          /TOOL7
1247  67340  7530   FLAGITX,FLAGIT
1248  67341  5514   ERRIZ,  ERRI
1249                /
1250                /
1251  67351          *67351
1252  67351  0000   PARTCTR:0
1253  67352  0000           0
1254  67353  0000   TCLKCTR,0              /TIME CLOCK CTR
1255  67354  0000           0
1256  67355  0000           0
1257  67356  0000   COFCTR, 0              /CYCLE OFF CTR
1258  67357  0000           0
1259  67360  0000           0
1260  67361  0000   CONCTR, 0              /CYCLE ON CTR
1261  67362  0000           0
1262  67363  0000           0
1263  67364  0000   PCYCTR, 0              /PART CYCLE CTR
1264  67365  0000           0
1265  67366  0000           0
1266  67367  0000   PCUCTR, 0              /PART CUTTING CTR
1267  67370  0000           0
```

```
1268  67371  0000            0
1269  67372  0000  TTCCTR,   0         /THIS TOOL CUTTING
1270  67373  0000            0
1271  67374  0000            0
1272  67375  0000  TTDCTR,   0         /THIS TOOL DULL CTR
1273  67376  0000            0
1274  67377  0000            0
1275                /
```

The principles of this invention having now been fully explained in connection with the foregoing, I hereby claim as my invention:

1. A method of optimizing the cutting operation of a machine tool, which includes a motor driven rotary cutter carrying spindle that is adapted to be fed relative to a workpiece at varying rates for performing a cutting operation on the workpiece, said method comprising the steps of:
   (a) Selecting a programmed spindle speed for said spindle;
   (b) Selecting a target horsepower for said cutting tool;
   (c) Calculating a target excitation current for said spindle motor which will produce the selected horsepower at said cutting tool at the selected spindle speed;
   (d) Measuring the actual excitation current of the spindle motor while said cutting tool is cutting said workpiece at a programmed feed rate;
   (e) Calculating the feed rate change which is required to produce the target excitation current in the spindle motor;
   (f) Changing said first feed rate by the amount calculated in step (e); and
   (g) Periodically repeating steps (d) through (f) while said cutting tool is cutting said workpiece.

2. The method according to claim 1 wherein said target horsepower is progressively raised up to an upper limit as the feed rate established in step (f) varies from a predetermined low feed rate value to a predetermined minimum feed rate value.

3. The method according to claim 1 wherein said target horsepower is progressively lowered down to a lower limit as the feed rate established in step (f) varies from a predetermined high feed rate value to a predetermined maximum feed rate value.

4. The method according to claim 1 wherein the calculation in step (c) is made in accordance with the formula:

$$IT = A\frac{(63,025\ THP)}{S} + BS + C$$

where IT=target armature current, THP=target cutter horsepower, S=spindle speed, and A, B and C are constants.

5. The method according to claim 1 wherein the calculation in step (e) is made in accordance with the formula:

$$\Delta F = \frac{(IT - IA)G + REM}{128}$$

where F=change in feed rate, IT=target armature current, IA=measured armature current, REM=the remainder from the previous calculation of $\Delta F$, and G=a constant.

6. The method according to claim 1 and also including the steps of either increasing the spindle speed if the new feed rate established in step (f) is higher than a predetermined level or decreasing the spindle speed if the new feed rate established in step (f) is below a predetermined level.

7. The method according to claim 2 and further comprising the steps of:
   ($F_1$) Measuring the total time that said cutting tool is cutting said workpiece;
   ($F_2$) Measuring the total time that said cutting tool is cutting said workpiece while the feed rate established in step (F) is below said low feed rate level; and
   ($F_3$) Generating a signal which signifies that said cutting tool is too dull for further use when the time measured in step ($F_2$) exceeds a predetermined percentage of the time measured in ($F_1$).

8. The method according to claim 1 wherein the calculation in step (c) is made in accordance with the formula:

$$IT = (AS^2 + BS + C)(63,025\ THP/S) + DS^2 + ES + F$$

where IT=target armature current, S=spindle speed in RPM, THP=target cutter horsepower and A, B, C, D, E and F are constants.

9. A method of optimizing the performance of a machine tool having a rotary spindle which is rotated by an electric spindle motor and having a cutting tool in said spindle for machining of a workpiece therewith, said method comprising the steps of:
   (a) Monitoring the armature current IA of said spindle motor;
   (b) Selecting a reference current level AIR GAP TOL (air gap tolerance) for said armature current IA below which said cutting tool is in an air gap in said workpiece;
   (c) Comparing the magnitude of IA+AGHYST to AGTOL, where AGHYST (air gap hysteresis) is a constant;
   (d) Setting the magnitude of AGHYST to a relatively low value when IA+AGHYST<AGTOL to prevent false triggering back to the condition IA+AGHYST>AGTOL due to variation in IA;
   (e) Increasing the feed rate of said machining operation from its programmed machining feed rate when IA+AGHYST<AGTOL to reduce the amount of time spent in traversing said air gap;
   (f) Setting the magnitude of AGHYST to a relatively high value when IA+AGHYST>AGTOL to prevent false triggering back to the condition IA+AGHYST<AGTOL due to variation in IA; and
   (g) Decreasing said feed rate back to its programmed machining feed rate when IA+AGHYST>AGTOL, which indicates that said cutting tool has re-engaged said workpiece after passing through said air gap.

10. The method according to claim 9 and also including the steps of:
   ($D_1$) Filtering signal IA with a high gain filter when IA+AGHYST<AGTOL; and
   ($F_1$) Filtering signal IA with a low gain filter when IA+AGHYST>AGTOL.

* * * * *